US010216887B1

(12) United States Patent
Shu et al.

(10) Patent No.: US 10,216,887 B1
(45) Date of Patent: Feb. 26, 2019

(54) METHODS, SYSTEMS, AND COMPUTER PROGRAM PRODUCTS FOR IMPLEMENTING AN ELECTRONIC DESIGN WITH TIME VARYING RESISTORS IN POWER GATING ANALYSIS

(71) Applicant: Cadence Design Systems, Inc., San Jose, CA (US)

(72) Inventors: John Yanjiang Shu, Pleasanton, CA (US); Wei Michael Tian, San Jose, CA (US); Richard J. O'Donovan, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 187 days.

(21) Appl. No.: 14/974,570

(22) Filed: Dec. 18, 2015

(51) Int. Cl.
*G06F 17/50* (2006.01)
(52) U.S. Cl.
CPC ...... *G06F 17/5081* (2013.01); *G06F 17/5009* (2013.01)
(58) Field of Classification Search
CPC .................................................. G06F 17/5081
USPC ........................................................ 716/113
See application file for complete search history.

(56) References Cited

U.S. PATENT DOCUMENTS

| 6,567,773 B1* | 5/2003 | Rahmat ............... G06F 17/5036 326/27 |
| 7,213,221 B1* | 5/2007 | Celik .................. G06F 17/5022 703/1 |
| 8,005,660 B2* | 8/2011 | Chiu ................... G06F 17/5009 703/14 |
| 8,176,463 B2 | 5/2012 | O'Riordan et al. |
| 8,245,165 B1* | 8/2012 | Tiwary ................ G06F 17/5031 716/108 |
| 8,554,530 B1 | 10/2013 | O'Riordan et al. |
| 8,954,307 B1 | 2/2015 | O'Riordan et al. |
| 8,954,908 B1 | 2/2015 | Liu et al. |
| 9,038,008 B1 | 5/2015 | O'Riordan et al. |
| 9,213,787 B1 | 12/2015 | O'Donovan et al. |
| 9,411,918 B1 | 8/2016 | O'Donovan et al. |

(Continued)

OTHER PUBLICATIONS

"Lecture 9—MOSFET (I): MOSFET I-V Characteristics", MIT Open Courseware, URL: https://ocw.mit.edu/courses/electrical-engineering-and-computer-science/6-012-microelectronic-devices-and-circuits-fall-2005/lecture-notes/lec9.pdf, Oct. 6, 2005.

(Continued)

*Primary Examiner* — Suchin Parihar
(74) *Attorney, Agent, or Firm* — Vista IP Law Group, LLP

(57) ABSTRACT

Various embodiments implement an electronic design with power gate analyses using time varying resistors. Design data of an electronic design or a portion thereof may be identified at an electronic design implementation module. First stage electrical characteristics may be generated at least by performing a first stage electrical analysis on a reduced representation of the electronic design or the portion thereof. Second stage electrical characteristics may further be generated at least by performing a second stage electrical analysis on a parasitic injected representation of the electronic design or the portion thereof with a time-varying model for the power gate. The electronic design or the portion thereof may then be further implemented based in part or in whole upon the one or more electrical analyses or simulations.

20 Claims, 15 Drawing Sheets

(56) References Cited

U.S. PATENT DOCUMENTS

| | | | | |
|---|---|---|---|---|
| 2002/0022951 | A1* | 2/2002 | Heijningen | G06F 17/5022 |
| | | | | 703/16 |
| 2003/0212973 | A1* | 11/2003 | Lin | G06F 17/5036 |
| | | | | 716/113 |
| 2008/0059143 | A1* | 3/2008 | Chiu | G06F 17/5009 |
| | | | | 703/14 |
| 2009/0007032 | A1* | 1/2009 | Kariat | H01L 22/12 |
| | | | | 716/136 |
| 2011/0178789 | A1* | 7/2011 | Miranda | G06F 17/5036 |
| | | | | 703/16 |
| 2013/0043957 | A1* | 2/2013 | Shibata | H03H 11/245 |
| | | | | 331/108 R |

OTHER PUBLICATIONS

"Lecture 8—MOSFET (I): MOSFET I-V Characteristics", MIT Open Courseware, URL: http://web.mit.edu/6.012/www/SP07-L8.pdf, Spring 2007.

"Lecture 10—MOSFET (I): MOSFET I-V Characteristics", MIT Open Courseware, URL: https://ocw.mit.edu/courses/electrical-engineering-and-computer-science/6-012-microelectronic-devices-and-circuits-fall-2005/lecture-notes/lec10.pdf, Oct. 13, 2005.

Henry, Michael B. "Emerging power-gating techniques for low power digital circuits." (2011).

B. Van Zeghbroeck, "Principles of Semiconductor Devices: Chapter 7: MOS Field-Effect-Transistors", URL: http://ecee.colorado.edu/~bart/book/book/chapter7/ch7_3.htm, 2011.

* cited by examiner

METHODS, SYSTEMS, AND COMPUTER PROGRAM PRODUCTS FOR IMPLEMENTING AN ELECTRONIC DESIGN WITH TIME VARYING RESISTORS IN POWER GATING ANALYSIS

BACKGROUND

The invention relates to technology for designing and verifying an electronic design, such as the design of an integrated circuit ("IC"). Modern electronic design is typically performed with computer aided design (CAD) tools or electronic design automation (EDA) systems. To design an integrated circuit, a designer first creates high level behavior descriptions of the IC device using a high-level hardware design language (HDL). Common examples of HDLs include Verilog and VHDL. An EDA system typically receives the high level behavioral descriptions of the IC device and translates this high-level design language into netlists of various levels of abstraction. Essentially, the process to implement an electronic device begins with functional design and verification (e.g., using RTL), and then proceeds to physical design and verification.

Circuit designers and verification engineers use different methods to verify circuit designs. One common method of verification is the use of simulation. Simulation dynamically verifies a design by monitoring behaviors of the design with respect to test stimuli. For many types of designs, simulation can and should be performed during the design process to ensure that the ultimate goals are achievable and will be realized by the finished product. The exploding demand for high performance electronic products has increased interest in efficient and accurate simulation techniques for integrated circuits. For analog designs, an analog-based simulation approach such as SPICE or SPICE-like simulations (e.g., FastSPICE, HSPICE, PSPICE, or any other SPICE-based or SPICE-compatible simulations) are commonly used to implement simulation of the design. For digital circuit, equivalent digital simulation is performed.

There are many types of electrical analyses that need to be performed to ensure the proper operation of an electronic design. For example, it is often desirable to analyze power distribution networks to check for potential problems relating to IR drops and/or electro-migration effects. Power distribution networks are used to distribute power and ground voltages from pad/package locations to circuit blocks in a design. With continuously shrinking device dimensions, faster switching frequencies and increasing power consumption in deep submicron technologies can cause large switching currents to flow in the power and ground networks, which degrade performance and reliability.

Due to the resistance of interconnects in the power networks, there is a voltage drop across the network, commonly referred to as IR drop. IR drop is a reduction in voltage that occurs on a power net (e.g., a $V_{DD}$ net) in integrated circuits. IC designs usually assume the availability of an ideal power supply that can instantly deliver any amount of current to maintain the specified voltage throughout the chip. In reality, however, a combination of increasing current per-unit area on the die and narrower metal line widths (which causes an increase in the power-grid resistance) causes localized voltage drops within the power grid, leading to decreased power supply voltage at cells and transistors. These localized drops in the power supply voltage decrease the local operating voltage of the chip, potentially causing timing problems and functional failures. IR drop may be both a local and global phenomena. IR drop can be local phenomenon when a number of cells in close proximity switch simultaneously, causing IR drop in that localized area. A higher power grid resistance to a specific portion of the chip can also cause localized IR drop. IR drop can be a global phenomenon when activity in one region of a chip causes effects in other regions. For example, one logic block may suffer from IR drop because of the current drawn by another nearby logic block.

The recent advances in very deep sub-micron (VDSM) integrated circuits (ICs) have brought new challenges in the physical design methodology process of integrated systems. In modern electronic circuits, geometries become smaller; clock frequencies increase; and on-chip interconnections gain increased importance in the prediction of performance. Nonetheless, it has been found that from 0.13 μm and bellow, ICs are more susceptible to wear-out over time (electro-migration or EM), which requires some degree of built-in fault-tolerance and a careful design planning. Meanwhile, increased power demanded on ever shrunk chip size causes higher current densities within the power routing. High currents also induce EM effects in which metal lines begin to wear out during a chip's lifetime. Electro-migration (EM) is an effect on a circuit caused by movement of ions in a conductor structure, which over time will reduce the effective ability and reliability of the conductor to conduct current from one part of the circuit to another. Electro-migration could significantly decrease the reliability of an IC, resulting in possible errors and failures in the IC product. With modern reductions in feature sizes made possible by improving manufacturing processes, the probability of failure due to electro-migration becomes much more possible due to increases of both the power density and the current density of wiring and power structures.

Power gating is a common technique to utilize one or more power gates to control the power supply to one or more portions of an IC chip to reduce power consumption. Accurately predicting the electrical behavior of an electronic design with power gates to ensure that the electronic design performs its intended functions and serves its intended purposes constitutes an important step in design implementation as well as subsequent verification phases. Conventional power gating approaches often replace power gates with the corresponding estimated resistance values and focus on the ON/OFF states, instead of ramp-up and/or power-up scenarios, and thus fail to provide sufficiently accurate electrical behavior of an underlying electronic design.

Therefore, it is important for an EDA verification tool to properly and adequately be able to perform electrical analysis to check for potential IR drop and EM problems.

SUMMARY

Disclosed are method(s), system(s), and article(s) of manufacture for implementing an electronic design with time varying resistors in power gate analysis in one or more embodiments. Some embodiments are directed at a method for implementing an electronic design with time varying resistors in power gate analysis. In these embodiments, design data of an electronic design or a portion thereof may be identified at an electronic design implementation module. First stage electrical characteristics may be generated at least by performing a first stage electrical analysis on a reduced representation of the electronic design or the portion thereof. Second stage electrical characteristics may further be generated at least by performing a second stage electrical analysis on a parasitic injected representation of the electronic design or the portion thereof with a time-varying model for the power gate. The electronic design or the portion thereof may then be further implemented based in part or in whole upon the one or more electrical analyses or simulations.

In some of these embodiments, the time-varying model may be selected from a plurality of models for the power gate based in part or in whole upon one or more criteria. In addition or in the alternative, a power net connecting the power gate to a power rail or a power stripe may be identified; and a reduced power net representation for the power net may also be identified. In some of these embodiments, a virtual power net connected to the power gate and receiving power from the power rail or the power stripe via the power gate may be identified; and a reduced virtual power net representation for the virtual power net may be determined. In some of these immediately preceding embodiments, a non-linear transistor model may be selected or identified for the power gate; and the reduced representation for the first stage electrical analysis may be determined at least by identifying the non-linear transistor model for the power gate, the reduced power net representation, and the reduced virtual power net representation into the reduced representation.

In some embodiments, a set of first-stage time steps may be determined for the first stage electrical analysis; and the first stage electrical characteristics may be generated at least by performing the first stage electrical analysis on the reduced representation of the electronic design or the portion thereof with the set of first-stage time steps. In addition or in the alternative, a first set of circuit components in the power net and a second set of circuit components in the virtual power net may be identified; a first representation for the first set of circuit components and a second representation for the second set of circuit components may be determined; at least some parasitic information associated with the power net and/or the virtual power net may be identified; and the time-varying resistance model may be identified from a plurality of models for the power gate for the second stage electrical analysis based in part or in whole upon one or more criteria.

In some of these immediately preceding embodiments, the parasitic injected representation may be generated at least by identifying the first representation, the second representation, and the time-varying resistance model for the power gate into the parasitic injected representation and further by attaching or stitching the at least some parasitic information to parasitic injected representation.

In some embodiments, the second stage electrical analysis may be initiated on the parasitic injected representation of the electronic design or the portion thereof; and the first stage electrical characteristics from the first stage electrical analysis may be combined or associated with the parasitic injected representation. In addition or in the alternative, the first stage electrical characteristics generated from the first stage electrical analysis may be identified; a second-stage time step of a set of second-stage time steps may be determined for the second stage electrical analysis based in part or in whole upon at least some of the first stage electrical characteristics; and the second stage electrical characteristics during the second-stage time step may be determined at least by performing the second stage electrical analysis on the parasitic injected representation with the time-varying model.

In some of the immediately preceding embodiments, a determination may be made to decide whether a different model is to be selected for the power gate; the different model may be selected for the power gate when it is determined that the different model is to be selected for the power gate; and the reduced representation may be updated with at least the different model. In addition or in the alternative, the at least some of the first stage electrical characteristics determined by the first stage electrical analysis may be identified; and an effective resistance value may be determined for the time-varying resistance model of the power gate during the second-stage time step based in part or in whole upon the at least some of the first stage electrical characteristics.

Some embodiments are directed at a method for implementing an electronic design with time varying resistors in power gate analysis. In these embodiments, design data including of an electronic design or a portion thereof including a power net, a virtual power net, and a power gate interconnecting the power net and the virtual power net may be identified at an electronic design implementation module including or functioning in conjunction with the at least one processor and at least partially stored in a non-transitory computer readable storage medium.

A model may be selected from a plurality of models, each representing the power gate, based in part or in whole upon one or more criteria for analyzing the electronic design or the portion thereof. Electrical behavior of the electronic design or the portion thereof may be generated at least by performing one or more transient electrical analyses on one or more representations of the power net, the virtual power net, and the model for the power gate; and the electronic design or the portion thereof may be implemented based in part or in whole upon the one or more electrical analyses or simulations.

In some of these embodiments, the one or more criteria for analyzing the electronic design or the portion thereof comprise a criterion for balancing accuracy and performance in the one or more transient electrical analyses and a criterion for characterizing ramp-up and/or ramp-down of the power gate.

In addition or in the alternative, a transistor model for the power gate may be identified for a first stage transient electrical analysis; and the first stage transient electrical analysis may be performed on the transistor model of the power gate and a reduced representation of the power net and/or the virtual power net. A time-varying model for the power gate may be identified for a second stage transient electrical analysis; and the second stage transient electrical analysis may be performed on the time-varying model of the power gate and a parasitic injected representation of the power net and/or the virtual power net.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are directed to methods, systems, and articles of manufacture for implementing an electronic design with time varying resistors in power gate analysis. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1:
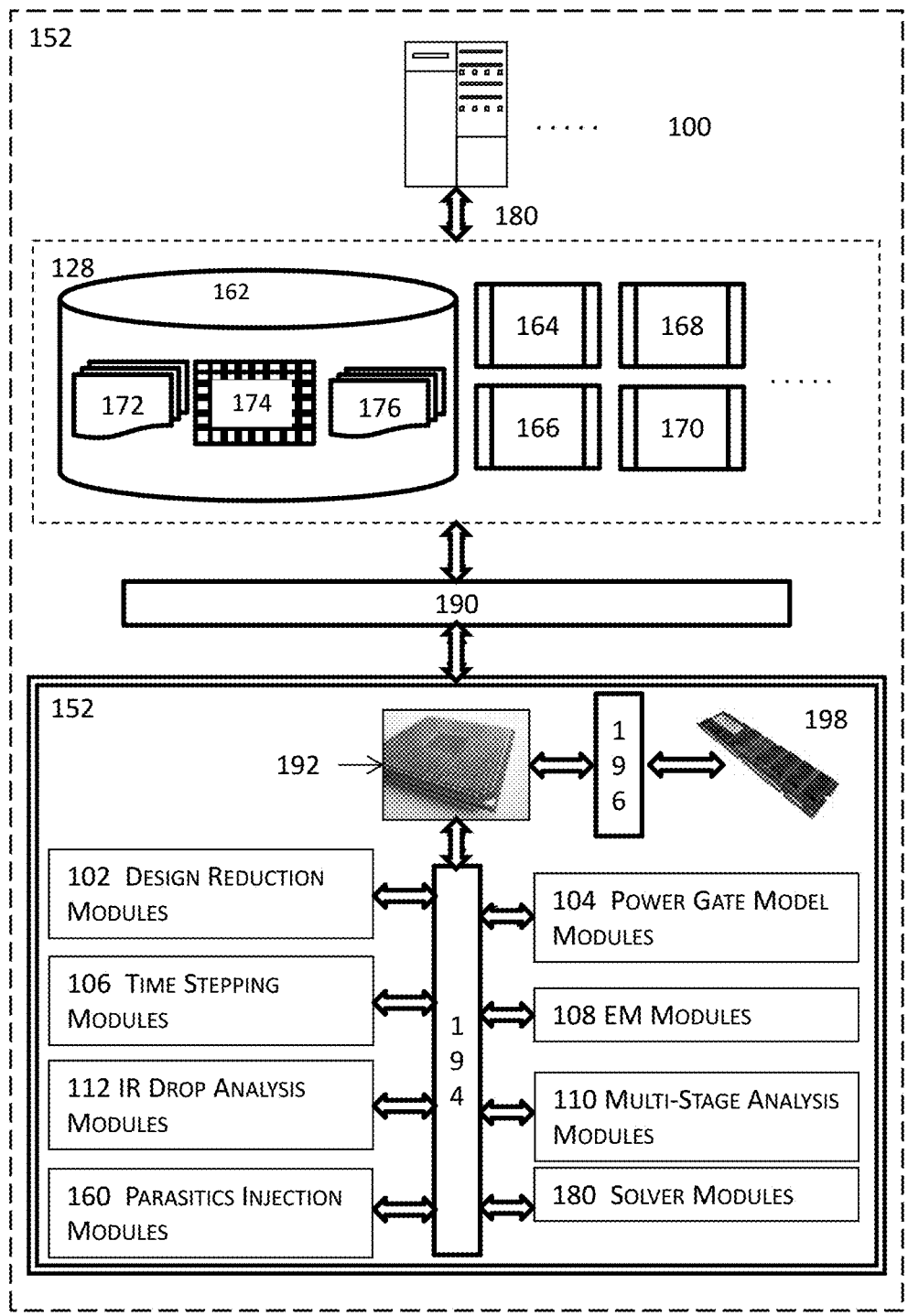
FIG. 1 illustrates a high level block diagram of a hardware system for implementing an electronic design with time varying resistors in power gate analysis in one or more embodiments.

FIG. 1 illustrates a high level block diagram of a system for implementing an electronic design with time varying resistors in power gate analysis in one or more embodiments. In these one or more embodiments, FIG. 1 illustrates a high level block diagram of a hardware system and may comprise one or more computing systems 100, such as one or more general purpose computers described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc.

The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of mechanisms or modules 152 including hardware and software modules or combinations of one or more hardware and one or more software modules that are stored at least partially in computer memory may comprises one or more design reduction modules 102 to reduce a representation of an electronic design (e.g., an RLC network) into a reduced representation such as an RC reduced (or RCR) network, a capacitance only (C-only) network, etc. of the electronic design. The set of modules 152 may further function in conjunction with one or more other modules (e.g., one or more multi-stage analysis modules 110, one or more solver modules 180, etc.) and include one or more power gate model modules 104 to identify existing power gate models or to generate one or more power gate models anew.

The set of modules 152 may further optionally include one or more time stepping modules 106 to determine one or more sets of time steps for the performance of transient electrical analyses for an electronic design. In addition or in the alternative, the set of modules 152 may further include one or more electro-migration (EM) modules 108 to perform various electro-migration analyses with respect to various EM-related constraints. In some embodiments, the set of modules 152 may further include one or more multi-stage simulation modules 110 to perform multi-stage simulations or analyses on an electronic design of interest with different representations of the underlying electronic design to achieve fast and accurate simulation and/or analysis results and/or to achieve an improved or optimal balance between speed and accuracy of various analyses.

In addition or in the alternative, the set of modules 152 may comprise one or more parasitic injection modules 160 to inject or stitch parasitic information to a representation of an electronic design or a portion thereof or to the corresponding circuit component designs in a representation of an electronic design or a portion thereof. The set of modules 152 may also include one or more solver modules 180 to identify one or more pertinent solvers to function in conjunction with one or more other modules (e.g., one or more time stepping modules 106, one or more multi-stage analysis modules 110, etc.) to solve the electrical behavior of the electronic design or a circuit component design (e.g., a power gate or a model therefor) therein.

The set of modules 152 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electro-migration and IR-drop analyses, or other power and signal integrity analyses with SPICE-level accuracy or better accuracy with SPICE or SPICE-like simulations (e.g., Fast-SPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these multi-fabric signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

In some embodiments, the computing system 100 may include the various resources 128 such that these various resources may be invoked from within the computing system via a computer bus 180 (e.g., a data bus interfacing a microprocessor 192 and the non-transitory computer accessible storage medium 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

The computing system may also include one or more modules in the set of modules 152. One or more modules in the set 152 may include or at least function in tandem with a microprocessor 192 via a computer bus 194 in some embodiments. In these embodiments, a single microprocessor 192 may be included in and thus shared among more than one module even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 2A:
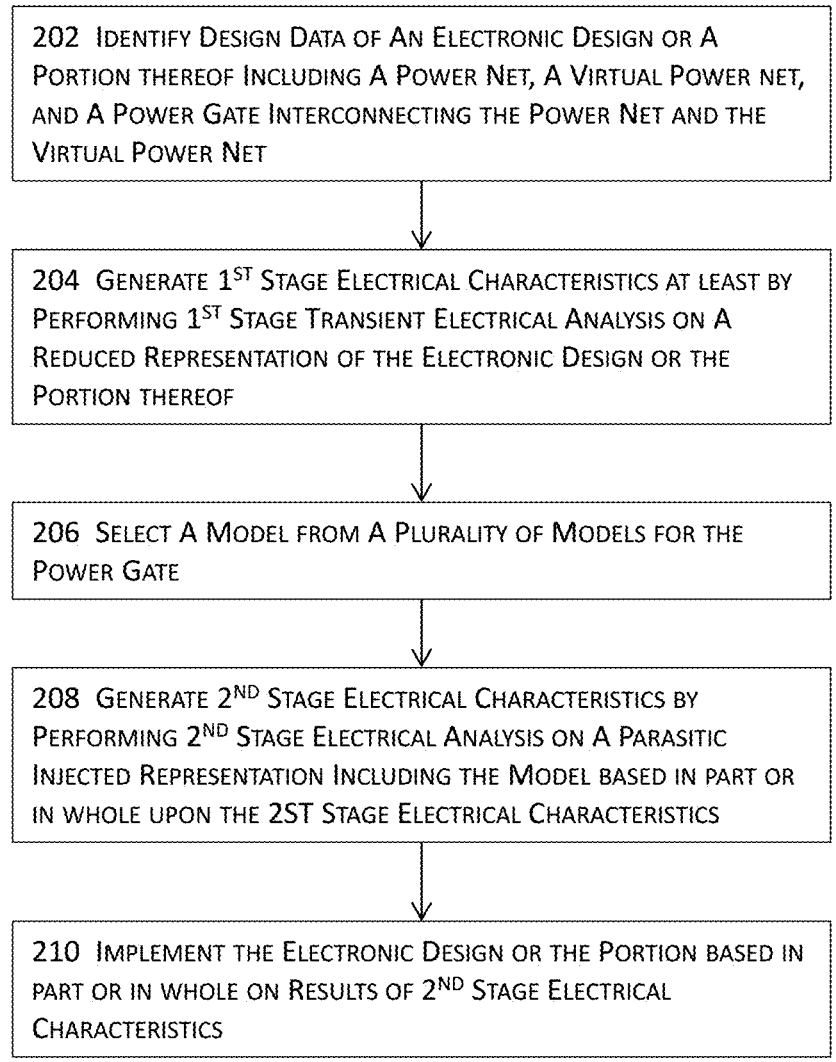
FIG. 2A illustrates a high level block diagram for implementing an electronic design with time varying resistors in power gate analysis in some embodiments.

FIG. 2A illustrates a high level block diagram for implementing an electronic design with time varying resistors in power gate analysis in some embodiments. In these embodiments, design data of an electronic design or a portion thereof may be identified at 202. These design data may include, for example, pre-layout design data (e.g., schematic design data stored in a schematic design database), post-layout design data (e.g., a layout stored in a layout design database), or a combination thereof. In terms of the constituents of the design data, the design data may include data of a power net, a virtual power net, and a power gate interconnecting the power net and the virtual power net.

A power gate may be identified at 304 in the electronic design or the portion thereof. A power gate may be connected directly without any intervening circuit components to a power rail, a power stripe, a voltage regulator, or any other power source to control (e.g., by switching on and off) power to the actual power consumers (e.g., a virtual power net including a sub-network of circuit components that receive power from the power rail or power stripe via the power gate) in some embodiments. In some other embodiments, a power gate may be indirectly connected to a power rail, a power stripe, etc. with one or more intervening circuit components such as an RC or RLC (resistance, inductance, and capacitance) network. A virtual power net includes a plurality of circuit component designs, interconnects, etc. to perform various functions and receives power supply from a power rail, a power stripe, a voltage regulator, etc. via the power gate, and its operations and hence functions are subject to the control of the corresponding power gate.

The first stage electrical characteristics may be generated at 204 at least by performing one or more first stage transient electrical analyses on representation or network of the electronic design or the portion thereof. The representation or network may include a reduced representation or network of the power net, a reduced representation or network of the virtual power net, and a transistor model for the power gate. In some of these embodiments, the first stage transient electrical characteristics generated at 204 may include the voltage waveforms at a plurality of nodes in the electronic design or the portion thereof. In some of these embodiments, the first stage electrical characteristics do not include static or transient electric currents in the electronic design or the portion. That is, these embodiments describe a voltage-based, rather than current-based, characterization of the electrical behavior of an electronic design.

One of the advantages of these embodiments that determine the voltage information, rather than the electric current information, at this stage (204) is that current calculations often require solving a system of equations iteratively and thus impose a higher burden on amount of computing resources (e.g., the memory footprint, the runtime, etc.) to arrive at a reasonably accurate set of solutions. It shall be noted that given the voltage-based framework described herein, some embodiments may nevertheless compute electric currents with the voltage information.

In some embodiments, one or more simplified or abstract representations may be used to represent at least the power net and the virtual power net of the underlying electronic design or a portion thereof. The first stage transient electrical analysis may be performed on these one or more simplified or abstract representations together with a transistor model for the power gate to compute the first stage transient electrical characteristics at 204. For example, the first stage transient electrical analysis may be performed at 204 on a representation of the underlying electronic design that includes one or more reduced representations for the power net and the virtual power net and a transistor model for the interconnecting power gate while some or all of the parasitic effects are excluded from consideration in the representation of the underlying electronic design in some embodiments.

In some other embodiments, the first stage transient electrical analysis may be performed at 204 on a representation of the underlying electronic design that includes one or more capacitance only (C-only) representations having only the capacitances for the power net and the virtual power net and a transistor model for the power gate interconnecting the power net and the virtual power net while excluding other parasitic effects from consideration in the capacitance only representation.

Yet in other embodiments, the first stage transient electrical analysis may be performed at 204 on one or more reduced representation of the power net and the virtual power net to which various other RLC reduction techniques may be applied. For example, various moment-matching RLC reduction techniques may be applied to generate one or more simplified representations of the power net and the virtual power net of an electronic design that does not exhibit significant inductance effects to preserve stability. As another example, RLC lines in an electronic design may be reduced to RLC lines with fewer circuit components by proscribing capacitances and inductances as functions of resistance. Yet as another example, transmission line theory and models and/or network simplification techniques may be used to generate a reduced representation of the entire RLC network of the power net and the virtual power net.

A model for the power gate may be selected at 206 from a plurality of models. In these embodiments illustrated in FIG. 2A, a power gate is represented as a transistor model while the power net and the virtual power net are represented as one or more reduced networks or representations to the multi-stage analysis module. The transistor model of a power gate may include, for example, a non-linear or large-signal model that describes the operating area of the power gate. Some examples of a non-linear or large-signal model include a physical model based on device physics, device parameters (e.g., oxide thicknesses, substrate doping concentrations, carrier mobility, etc.), and/or approximate modeling of physical phenomena within a power gate, an empirical model derived from curve fitting to fit data of the power gate, and a tabular model including a number of values for device parameters (e.g., threshold voltage, drain current, etc.), device parasitics, etc.

A transistor model of a power gate may also include a special purpose model such as a small-signal or linear model to serve purposes including, for example, evaluations of device stability, gain, noise, bandwidth, etc. In a multi-stage analysis approach that generates a first stage electrical behavior (e.g., voltage waveforms) with a fast first stage transient analysis and then uses the first stage electrical behavior in the second stage transient analysis to generate more accurate electrical behavior of the underlying electronic design, the first stage transient electrical analysis may utilize a transistor model listed above for all power gates or multiple transistor models for the power gates in the underlying electronic design. For the second stage, power gates may be represented as one or more transistor models listed above, one or more time-varying resistance models, one or more fixed resistance models, or any combinations thereof for the power gates in an electronic design.

The model for a power gate may be selected at 206 based in part or in whole upon one or more criteria. For example, fixed resistance transistor models may be selected for quick evaluations of an electronic design where accuracy may not necessarily be the ultimate goal, and a quick evaluation may be all that is needed. For verification or signoff prior to manufacturing where accuracy may be far more important to accurately portray the electrical behavior of an electronic design, non-linear transistor models may be selected to represent power gates in an electronic design although these non-linear transistor models often require expensive iterative solution processes to reach convergent solutions.

In some other scenarios where a balance between accuracy and speed is sought after, time-varying resistance model may be selected because of their efficiency and reasonably good accuracy. A time-varying resistance model represents a power gate as a time-varying resistor whose resistance value is held constant with in one or several time steps in a transient analysis but generally varies with time. In these embodiments, a time-varying resistance model represents a piecewise linear function between its resistance values and time.

With the model selected for a power gate at 206, the second stage electrical characteristics may be generated at 208 at least by performing one or more second stage transient electrical analyses on a parasitic injected representation for the electronic design or the portion thereof identified at 202. The parasitic injected representation includes some or all parasitic information of at least the power net and the virtual power net and thus represents a more complete network than the reduced representation used in the first stage transient electrical analyses and including reduced or even no parasitic information for at least the power net and the virtual power net. For example, a parasitic injected representation for a power net (and/or a virtual power net) may include a full RLC network of the underlying circuit design.

The incorporation of some or all parasitic effects in the parasitic injected representation provides a great improvement over convention approaches that often assume a power net (e.g., a power rail or a power stripe) supplying a constant voltage supply (e.g., a constant $V_{DD}$ value) to the interface devices connected to the power net via interface or tap nodes. In addition or in the alternative, the physical design data and/or other physical and electrical data (e.g., thermal data) may further be leveraged to provide even more accurate characterization of electrical parasitics, without assuming some approximated or estimated parasitic effects for the interface devices as conventional approaches often do.

With the more complete representation of the underlying electronic design, electrical parasitics may be more correctly modeled, and the electrical behavior of the underlying electronic design may thus be more accurately characterized. The electronic design or the portion thereof identified at 202 may then be further implemented at 210 based in part or in whole upon the results of the second stage electrical characteristics generated at 208. For example, IR drop analyses or EM analyses may be performed with the electrical behavior to identify any violations or potential violations and to initiate fixes to correct these violations or potential violations.

One of the advantages of computing voltage information during the first stage and/or the second stage, rather than electric current information, is that the solution process no longer requires solving for electric currents (e.g., electric currents at probed locations) with the electric currents being a part of variables for different portions of a global circuit analysis. Another advantage of computing voltage information, rather than electric current information, is that the time consuming and computation intensive iterative processes of solving for electric currents via the conductance matrix may be avoided. This is especially true when the underlying electronic design operates at a fast switching frequency and hence requires small time-steps in performing transient analyses or simulations. Faster switching frequencies often require smaller time steps and may thus further require longer runtime and more computation resources.

With the voltage information generated by the voltage-based, multi-stage approach, electric current information may be computed on the fly or concurrently; static and/or transient IR drop may be determined in conjunction with the resistance values of various devices, interconnects, etc.; and static and/or transient electric current density information may also be determined with the physical data (e.g., the cross-sectional areas of conductors) to determine the effects of electro-migration and to effect fixes when the results of the IR drop analysis and/or the electro-migration analysis indicate any concerns, issues, or violations.

Figure 2B:
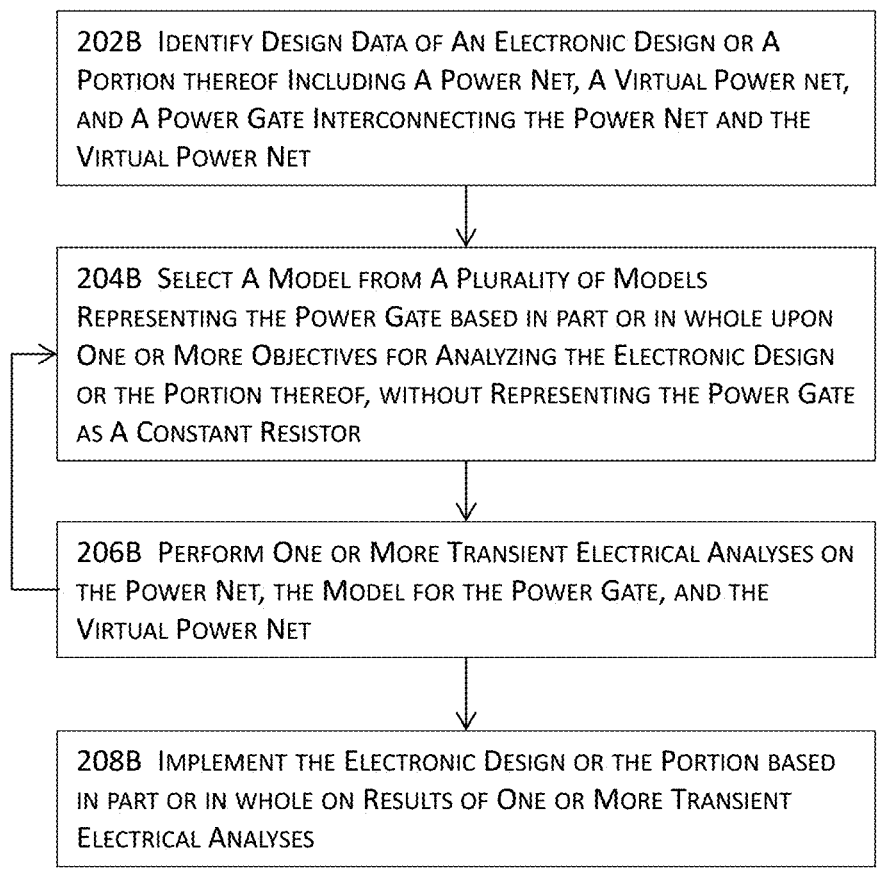
FIG. 2B illustrates another high level block diagram for implementing an electronic design with time varying resistors in power gate analysis in some embodiments.

FIG. 2B illustrates another high level block diagram for implementing an electronic design with time varying resistors in power gate analysis in some embodiments. In these embodiments, design data of an electronic design or a portion thereof may be identified at 202B. These design data may include, for example, pre-layout design data (e.g., schematic design data stored in a schematic design database), post-layout design data (e.g., a layout stored in a layout design database), or a combination thereof. In terms of the constituents of the design data, the design data may include data of a power net, a virtual power net, and a power gate interconnecting the power net and the virtual power net.

A model may be selected at 204B from a plurality of models, each representing the power gate, based in part or in whole upon one or more objectives for analyzing the electronic design or the portion thereof. In some of these embodiments, power gates in the electronic design or the portion thereof are not represented by any fixed resistors having their respective, constant resistance values. In these embodiments, power gates may be represented to the analysis modules (e.g., the multi-stage analysis modules) in the form of one or more non-linear or large-signal models, one or more time-varying resistance models, or any combinations thereof.

One or more transient electrical analyses may be performed at 206B on the power net and the virtual net identified at 202B as well as on the power gate interconnecting the power net and the virtual power net to generate the electrical behavior of the electronic design or the portion thereof identified at 202B. In some embodiments, these transient electrical analyses are performed in multiple stages where a first stage electrical behavior (e.g., voltage waveforms) is generated with a fast first stage transient electrical analysis on a reduced representation.

The first stage electrical behavior is then used in the second stage transient electrical analysis performed on a parasitic injected representation to generate more accurate electrical behavior of the underlying electronic design. In some embodiments, the first stage and/or the second stage is voltage-based in that these one or more transient electrical analyses solve for and hence generate voltage information but not electric current information although electric currents may be concurrently or on demand computed by using the voltage information and device characteristic relations (e.g., a relation between the electric current, voltages, and device parameters).

The electronic design or the portion thereof identified at 202 may then be further implemented at 208B based in part or in whole upon the results of the second stage electrical characteristics generated at 206B. For example, IR drop analyses or EM analyses may be performed with the electrical behavior to identify any violations or potential violations and to initiate fixes to correct these violations or potential violations.

Figure 3A:
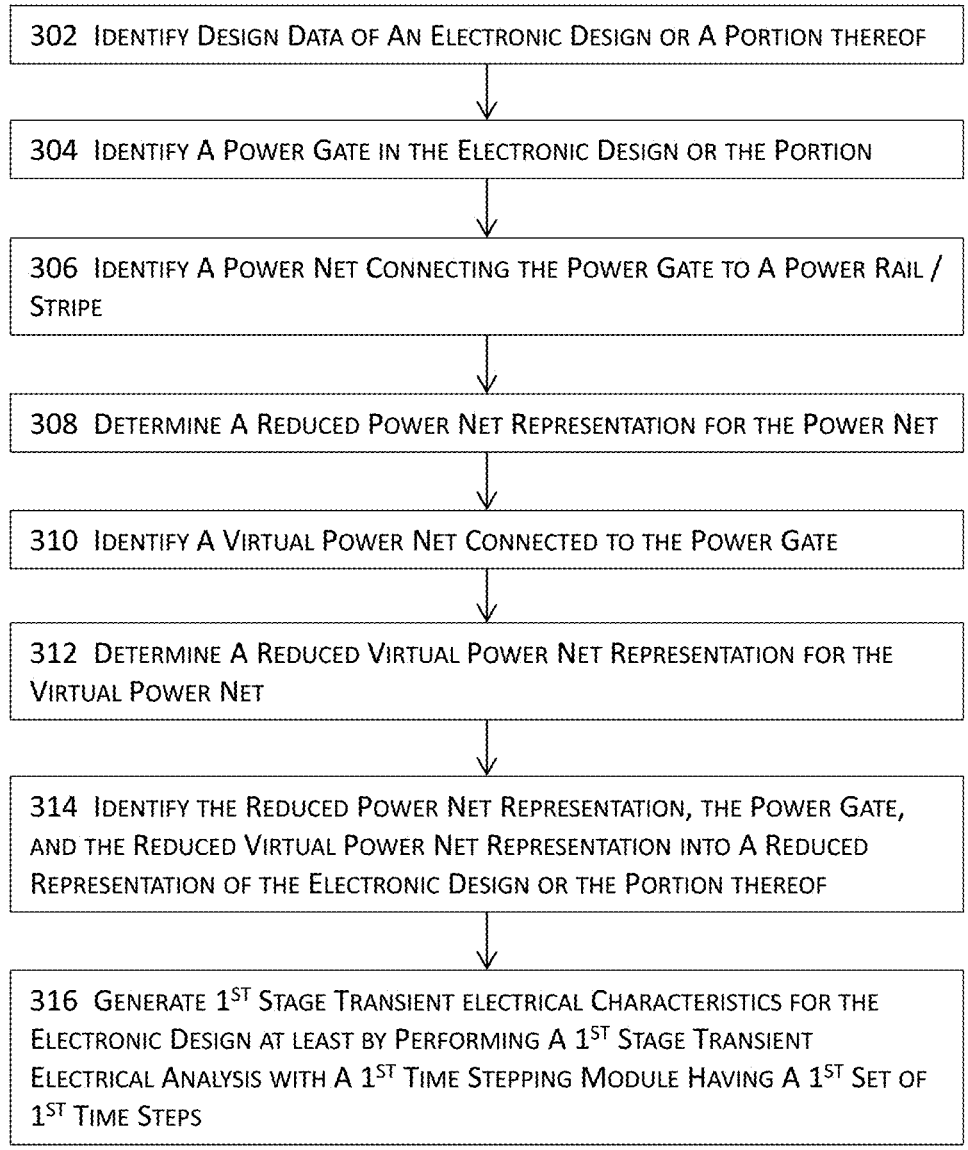
FIG. 3A illustrates a more detailed block diagram for a part of the block diagram for implementing an electronic design with time varying resistors in power gate analysis illustrated in FIG. 2A in some embodiments.

FIG. 3A illustrates a more detailed block diagram for a part of the block diagram for implementing an electronic design with time varying resistors in power gate analysis illustrated in FIG. 2A in some embodiments. More specifically, FIG. 3A illustrates a more detailed flow chart for a first stage transient electrical analysis for implementing an electronic design with time varying resistors in power gate analysis. In these embodiments, design data of an electronic design or a portion thereof may be identified at 302.

These design data may include, for example, pre-layout design data (e.g., schematic design data stored in a schematic design database), post-layout design data (e.g., a layout stored in a layout design database), or a combination thereof. In some of these embodiments where only a smaller portion (e.g., a smaller portion of a layout) of an electronic design is identified, a simulatable representation may nevertheless be constructed to represent the entire electronic design by using the available pre-layout design data and the post-layout design data. For example, when only a smaller portion of a layout is identified or available, a simulatable representation of the entire electronic design may be constructed by leveraging as much available post-layout design data as possible and utilizing the pre-layout design data (e.g., schematic design data) to generate a simulatable representation for the underlying electronic design despite the unavailability of some post-layout design data.

A power gate may be identified at 304 in the electronic design or the portion thereof. A power gate may be connected directly without any intervening circuit components to a power rail, a power stripe, a voltage regulator, or any other power source to control (e.g., by switching on and off) power to the actual power consumers (e.g., a virtual power net including a sub-network of circuit components that receive power from the power rail or power stripe via the power gate) in some embodiments. In some other embodiments, a power gate may be indirectly connected to a power rail, a power stripe, etc. with one or more intervening circuit components such as an RC network or an RLC network. A power net connecting the power gate to the power rail, the power stripe, or any other power source may be identified at 306. A reduced power net representation may be determined at 308 for the power net identified at 306. The reduced power net representation determined at 308 may exclude some or even all parasitic information in some embodiments.

A virtual power net connected to the power gate and receiving power from the power rail, the power stripe, or any other power source may be identified at 310. A virtual power net includes a plurality of circuit component designs, interconnects, etc. to perform various functions and receives power supply from a power rail, a power stripe, a voltage regulator, etc. via the power gate, and its operations and hence functions are subject to the control of the corresponding power gate. As in the case for the power net, a reduced virtual power net representation may also be determined at 312 for the virtual power net identified at 310. The reduced virtual power net representation determined at 312 may also exclude some or even all parasitic information in some embodiments.

As described above with reference to FIG. 2A, a first stage transient electrical analysis may be performed on one or more reduced representations to generate fast transient electrical characteristics (e.g., voltage waveforms) that may be further forwarded to the second stage transient electrical analysis that is performed on more complete representations of the underlying electronic design and produces not only more accurate second stage transient electrical characteristics but also electrical behavior that more accurately portraits the ramp-up and/or ramp down of power gates and/or other switches.

The reduced power net representation, the model of the power gate, and the reduced representation of the virtual power net may be identified at 314 into a reduced representation of the electronic design or the portion thereof. The model identified for the power gate may include, for example, a non-linear or large-signal model that describes the operating area of the power gate such as a physical transistor model, an empirical transistor model, a tabular transistor model, etc. as those described above with reference to FIG. 2A in some embodiments. In these embodiments, a power gate is analyzed or simulated as a non-linear transistor while the power net and the virtual power net interconnected by the power gate are analyzed or simulated as reduced representations having reduced or excluded parasitic information during the first stage transient electrical analyses that generate first stage transient electrical characteristics (e.g., voltages) for the underlying electronic design or the portion thereof.

Parasitic information will be infused into a more complete representation such as a parasitic injected representation for the power net and/or the virtual net, and the power gate may be represented as a timing-varying resistance model or a non-linear transistor model for the second stage transient electrical analyses to better resemble the actual characteristics and behavior of the underlying electronic design or the portion thereof. In some of these embodiments, no power gates in an electronic design or a portion thereof may be represented as fixed resistors having constant resistance values such that the ramp-up and/or ramp-down behaviors of the power gates may be more accurately captured. Correctly capturing the ramp-up and/or ramp-down behaviors of power gates may be more of some particular interest in analyses such as electro-migration reliability analyses and/or IR drop analyses.

Figure 3B:
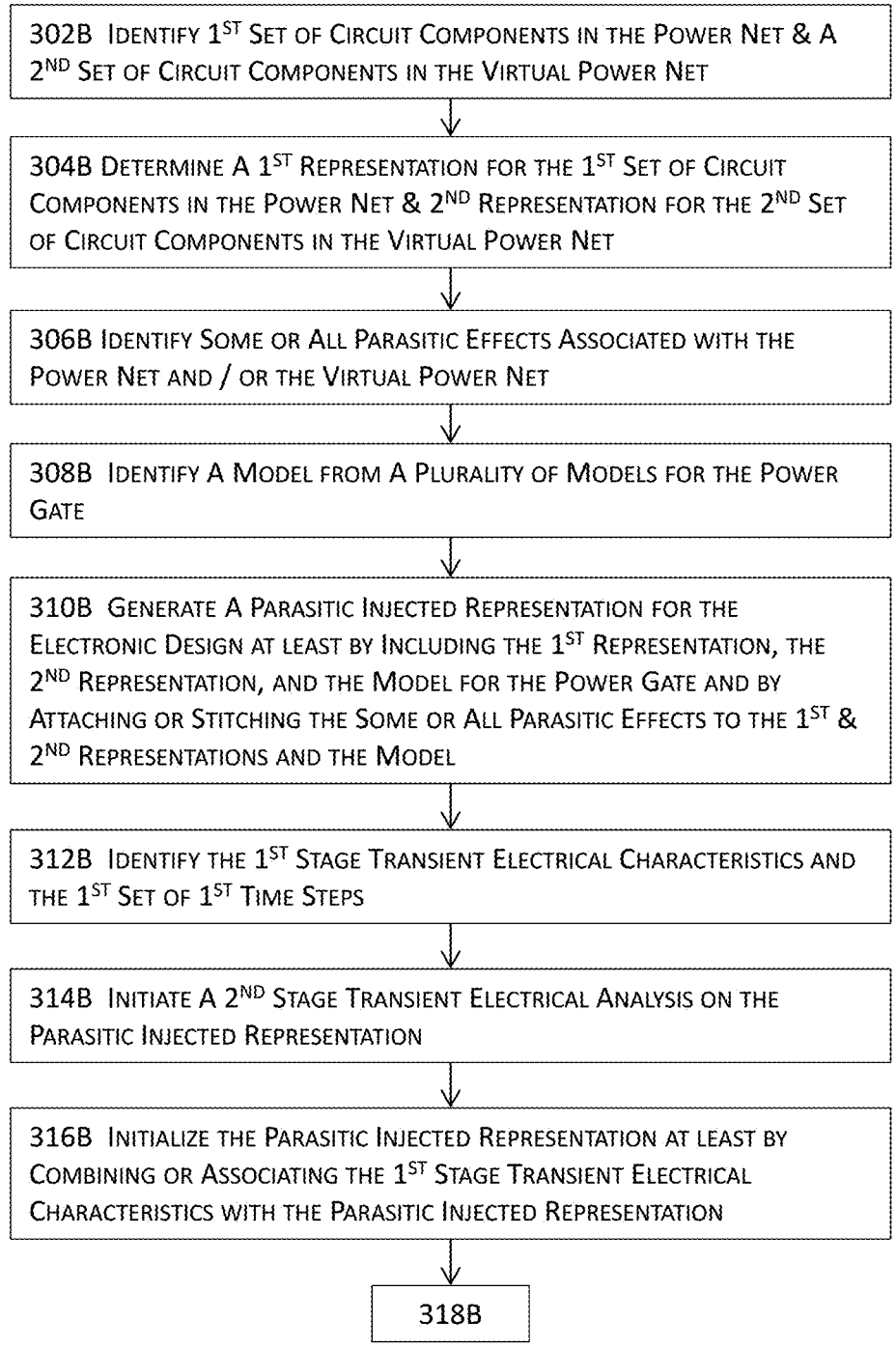
FIGS. 3B-C jointly illustrate a more detailed block diagram for a part of the block diagram for implementing an electronic design with time varying resistors in power gate analysis illustrated in FIG. 2A in some embodiments.
Figure 3C:
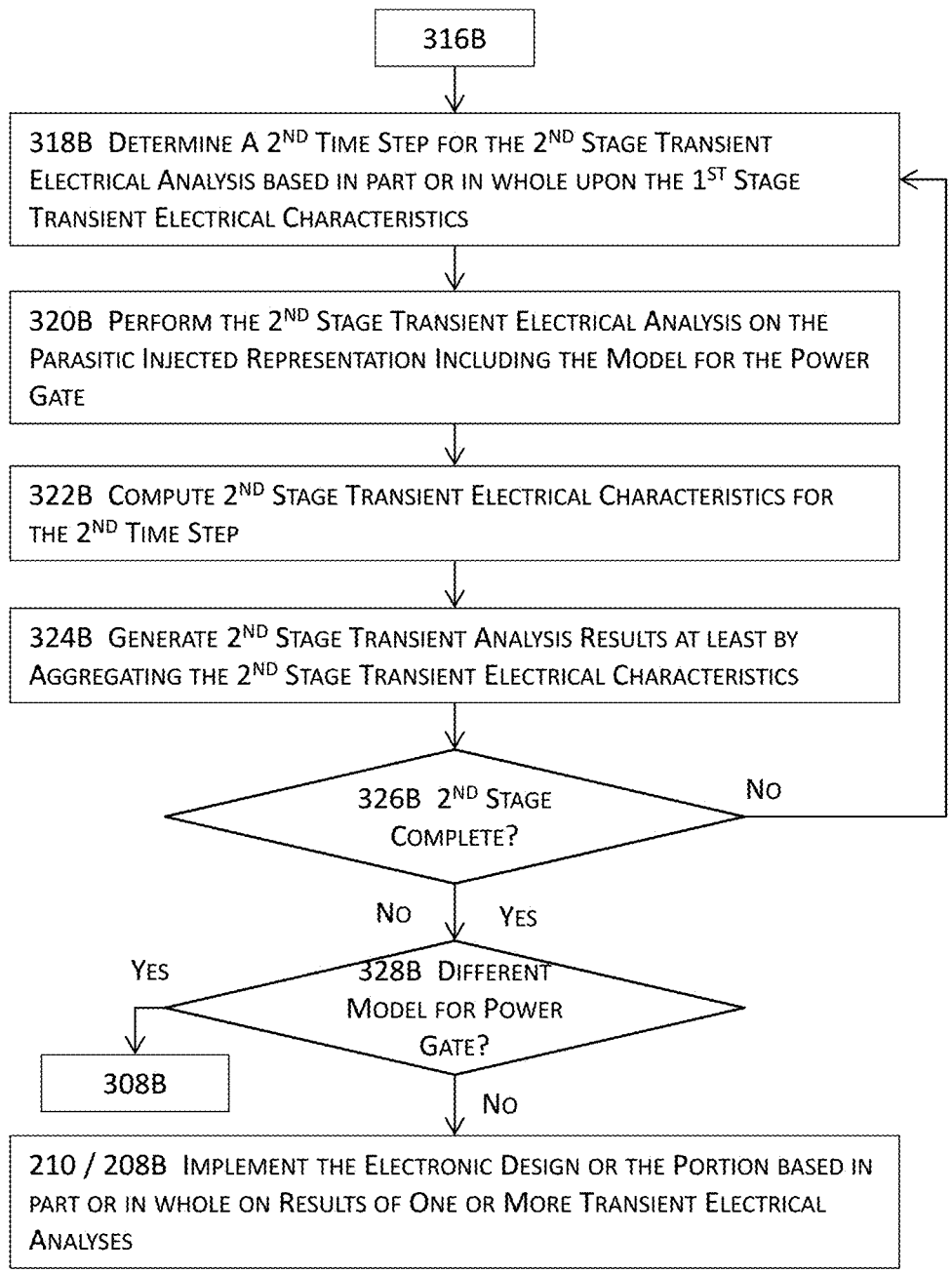

FIGS. 3B-C jointly illustrate a more detailed block diagram for a part of the block diagram for implementing an electronic design with time varying resistors in power gate analysis illustrated in FIG. 2A in some embodiments. More specifically, FIGS. 3B-C illustrate a more detailed flow chart for a second stage transient electrical analysis for implementing an electronic design with time varying resistors in power gate analysis. In these embodiments, a first set of circuit component designs in the power net may be identified, and a second set of circuit component designs in the virtual power net identified at 302 may be identified at 302B.

Unlike the reduced representations utilized during the first stage transient electrical analyses, the first and second representations determined at 304B include more complete design data. For example, a reduced representation utilized in a first stage transient electrical analysis may have as many resistors collapsed or shorted to as few nodes as possible to arrive at a capacitance only representation for a power net (or a virtual power net) in some embodiments. The first representation for the same power net determined at 304B may nevertheless include more complete design data including, for example, some or even all of the resistances in the power net.

For example, a first representation for a power net may include a full RLC network of the power net in some embodiments. A first representation may be determined for the first set of circuit component designs for the power net, and a second representation may be determined for the second set of circuit component designs for the virtual power net at 304B. Some or all parasitic information or effects associated with the power net and/or the virtual power net may be identified at 306B. A model for the power gate may also be identified at 308B from a plurality of models.

With the first and second representations, the parasitic information or effects, and the model for the power gate identified, a parasitic injected representation may be generated at 310B for the electronic design or the portion thereof at least by including the first representation, the second representation, the model of the power gate in the parasitic injected representation and further by attaching or stitching the some or all parasitic information or effects identified at 306B into the parasitic injected representation.

The first stage transient electrical characteristics (e.g., voltage waveforms at various nodes in the electronic design or the portion thereof) may be identified at 312B. The first set of first time steps used in the first stage transient electrical analyses may also be identified at 312B. The first stage transient electrical characteristics may be referenced in the second stage transient electrical analyses to determine the time stepping strategy for a second set of second time steps for the second stage transient electrical analyses.

For example, a time stepping module may check the voltage rate of change from the first stage transient electrical characteristics where a relatively larger voltage rate of change corresponds to a smaller time step, and a relatively smaller voltage rate of change corresponds to a larger time step for the second stage transient electrical analyses. The first stage transient electrical characteristics may be referenced during the second stage transient electrical analyses to determine time-varying resistance values, at least during the initial iteration(s) in the second stage transient electrical analyses.

The second stage transient electrical analysis may be initiated at 314B on the parasitic injected representation. The parasitic injected representation may be initialed at 316B by combining or associating the first stage transient electrical characteristics with the parasitic injected representation. For example, voltage waveforms computed for various nodes in the electronic design may be associated with the corresponding nodes in the parasitic injected representation of the electronic design or the portion thereof at 316B.

A second time step in a set of second time steps for the second stage transient electrical analyses may be determined at 318B based in part or in whole upon the first stage transient electrical characteristics. As described above, a time stepping module may check the voltage rate of change from the first stage transient electrical characteristics where a relatively larger voltage rate of change corresponds to a smaller time step, and a relatively smaller voltage rate of change corresponds to a larger time step for the second stage transient electrical analyses. If the voltage rate of change is relatively large (e.g., during ramp-up or ramp-down of a power gate), the time stepping module may adopt a smaller second time step for the second stage transient electrical analyses to capture rapid swing in voltages. Other the other hand, if the voltage rate of change is relatively small, the time stepping module may adopt a larger second time step for the second stage transient electrical analyses because the voltage exhibits relatively small variations over a longer time period.

The second stage transient electrical analysis may be performed at 320B on the parasitic injected representation that includes the model for the power gate, the first and second representations respectively for the power net and the virtual power net, and the some or all parasitic information or effects. The second stage transient electrical characteristics may be computed at 322B for the second time step determined at 318B. In some embodiments where a power gate is represented as a time-varying resistance model, the power gate is modeled as a resistor whose resistance value changes over time.

In some of these embodiments, a time-varying resistance model models a power gate as a resistor whose resistance value changes with time in a piecewise linear fashion. In these immediately preceding embodiments, the resistance value of the resistor representing a power gate may be held constant during a time period although the resistance value may nevertheless change from one time period to the next time period. For example, the resistance value may be held constant during a time step although the resistance value may change to another constant during the next time step. More details about a time-varying resistance model for a power gate will be described below with reference to FIG. 3D.

The second stage transient electrical analysis results may be generated at 324B at least by aggregating the second stage transient electrical characteristics generated for the second time step with the second stage transient electrical characteristics generate for zero or more prior second time steps. A determination may be made at 326B to decide whether the second stage transient electrical analyses are complete. If the determination is negative, the process may return to 318 to determine the next second time step for the second stage and repeat the acts 318B through 326B.

Alternatively, the process may proceed to determine whether a different model is desired or required for the power gate at 328B in some embodiments. If the determination at 328B is affirmative, the process may return to 308B to identify a different model for the power gate. In these embodiments, the model selected to represent a power gate may change from one second time step to another second time step during the second stage transient electrical analyses based in part or in whole upon one or more criteria including a speed criterion, an accuracy criterion, a criterion about balanced speed and accuracy, the purpose of the electrical analyses (e.g., for quick evaluation, verification, signoff, etc.), the correctness, accuracy, or deviations thereof for the simulated electrical behavior of the underlying electronic design, or any combination thereof.

For example, a fixed resistance model may be initially selected to represent a power gate during the second stage. If the simulated electrical behavior desires or requires a more accurate model for the power gate to capture, for example, simultaneous switching of a plurality of power gates during a time period, a more accurate time-varying resistance model may then be identified for the plurality of power gates. If the determination at 328B is negative, the electronic design or the portion thereof may then be further implemented at 210 based in part or in whole upon the results of the second stage electrical characteristics in an identical or substantially similar manner as that described in 210 with reference to FIG. 2A.

If the second stage analyses are determined to be complete at 326B is affirmative, the process may nevertheless proceed to 328B to determine whether a different model may be required or desired for further second stage transient electrical analyses. For example, the electrical behavior of the underlying electronic design generated by the second stage may not entirely satisfy or meet the requirements or the specification (e.g., the electrical behavior may exhibit some outliers at certain second time steps). In this example, the process may also return to 308B to identify a different model for the power gate, identify and associate the portion of the second stage analysis results prior to the time period of interest to the parasitic injected representation, and repeat the second stage transient electrical analyses at least for the time period of interest with the different model in the parasitic injected representation.

Figure 3D:
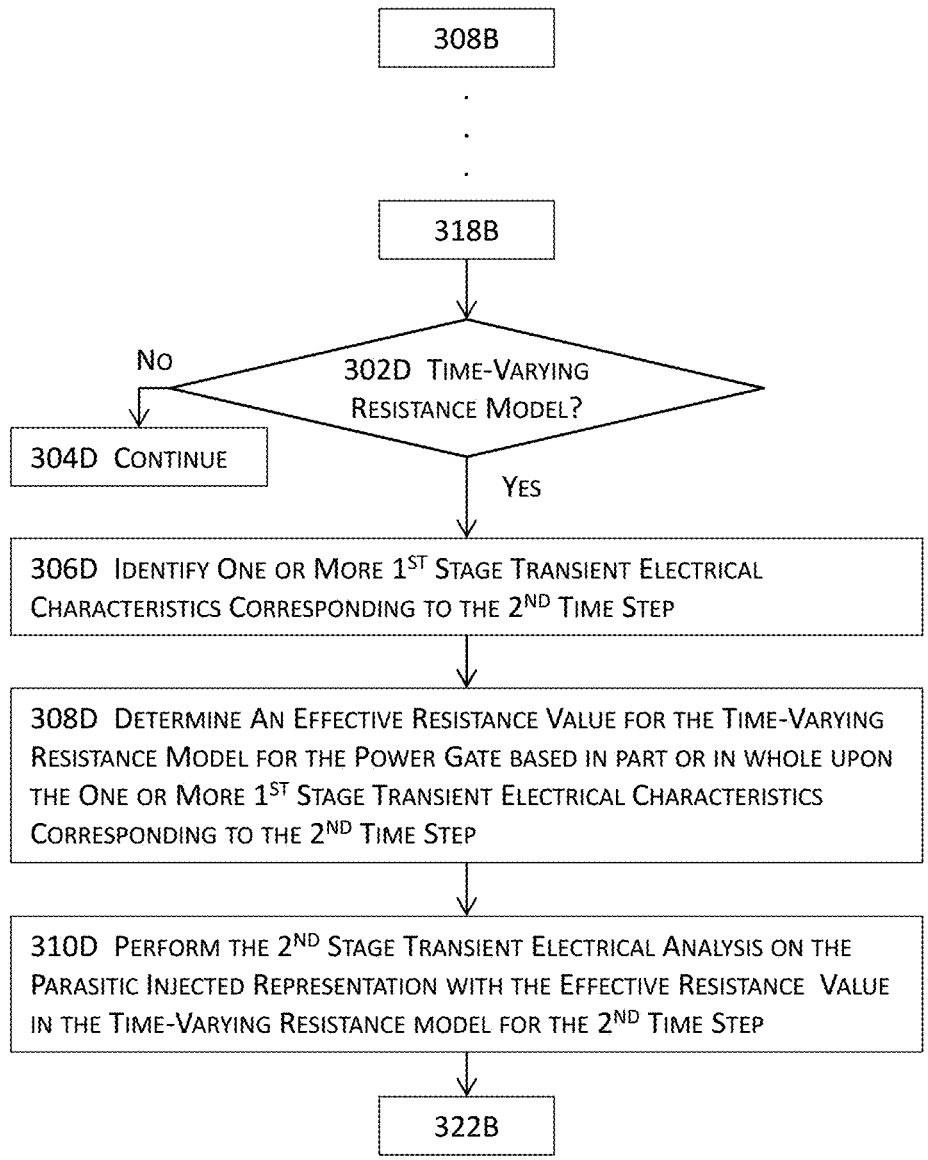
FIG. 3D illustrates a more detailed block diagram for a part of the block diagram for implementing an electronic design with time varying resistors in power gate analysis illustrated in FIGS. 3B-C in some embodiments.

FIG. 3D illustrates a more detailed block diagram for a part of the block diagram for implementing an electronic design with time varying resistors in power gate analysis illustrated in FIGS. 3B-C in some embodiments. More specifically, FIG. 3D illustrates a more detailed block diagram for implementing an electronic design with time varying resistors in power gate analysis during a second stage transient electrical analyses where a time-varying resistance model is identified to represent a power gate. In these embodiments, a determination is made at 302D to decide whether a time-varying resistance model is selected to represent the power gate identified at 308B.

Figure 3E:
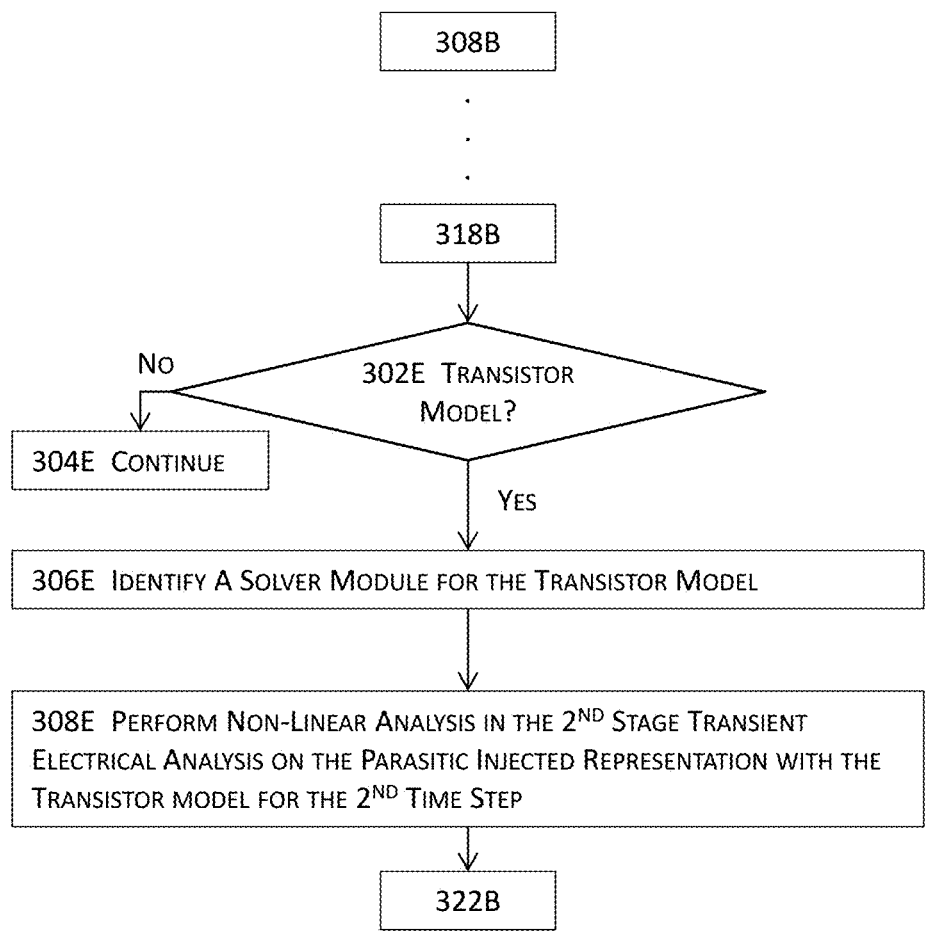
FIG. 3E illustrates another more detailed block diagram for a part of the block diagram for implementing an electronic design with time varying resistors in power gate analysis illustrated in FIGS. 3B-C in some embodiments.
Figure 3F:
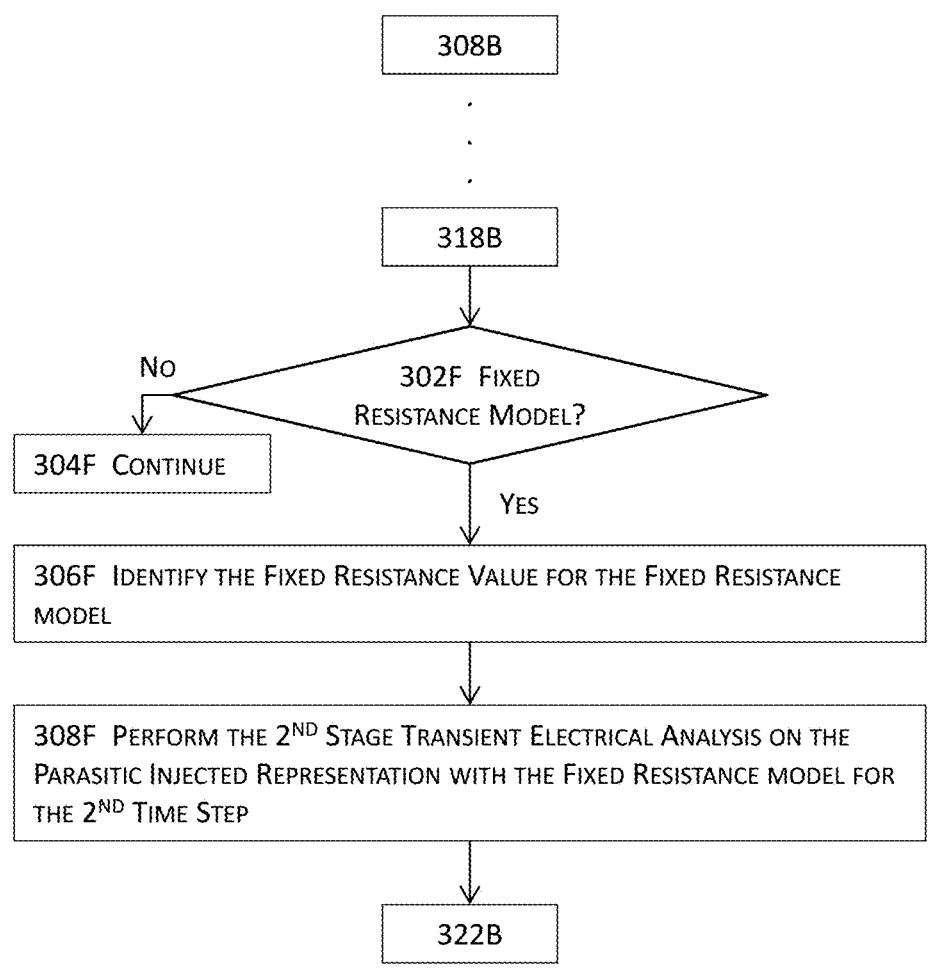
FIG. 3F illustrates another more detailed block diagram for a part of the block diagram for implementing an electronic design with time varying resistors in power gate analysis illustrated in FIGS. 3B-C in some embodiments.

If the determination result is negative, the process may proceed to 304D to continue the process with the appropriate transistor model for the power gate illustrated in, for example, FIG. 3E or FIG. 3F. If the determination result is affirmative at 302D, one or more first stage transient electrical characteristics (e.g., voltage waveforms at a plurality of nodes determined from the first stage transient electrical analyses) may be identified at 306D for the current second time step in the second stage transient electrical analyses. As described earlier, the second time steps for the second stage transient electrical analyses may be determined based in part or in whole upon the first stage transient electrical characteristics.

In the following example, voltage values will be used in place of electrical characteristics for the ease of illustration and explanation. It shall be noted that electrical characteristics determined at the first and/or the second stage may nevertheless include other electrical characteristics and are thus not limited to voltages. For example, the second time steps may be determined based in part or in whole upon the rate of change of a nodal voltage values (e.g., the voltage waveform at the drain of the power gate). A more rapid rate of change in the voltage values may desire or require a smaller time step to more accurately capture the changes in the voltage values, whereas a smaller rate of change in the voltage values may desire or require a larger time step to reflect the relatively stable voltage value within a longer time period. The second time steps used in the second stage transient electrical analyses may thus be independent of the first time steps used in the first stage transient electrical analyses.

An effective resistance value for the time-varying resistance model for the power gate may then be determined at 308D based in part or in whole upon the one or more first stage transient electrical characteristics that correspond to the second time step in the second stage transient electrical analyses. In attaching the first stage transient electrical characteristics to the parasitic injected representation of the underlying electronic design, the first stage transient electrical characteristics may be held constant in each second time step during the second stage transient electrical analyses in some embodiments.

These attached first stage transient electrical characteristics may then be used in the second stage transient electrical analyses and may be further revised by the solution process. For example, in some embodiments where the current second time step is included in or equal to a first time step, the voltage value determined for the first time step may be held constant for the voltage value in the current second time step.

In some embodiments where the current second time step spans across a plurality of first time steps during the first stage transient electrical analyses, the voltage value for the current second time step may be determined from the corresponding voltage values determined for the plurality of first time steps. For example, the voltage value may be held constant for the current second time step as the average or weighted average of the voltage values in the plurality of first time steps from the first stage transient electrical analyses.

In these embodiments, the electrical characteristics for the second time steps in the second stage transient electrical analyses are held constant within each second time step although each electrical characteristic may nevertheless vary from one second time step to the next second time step in the second stage transient electrical analyses. With the first stage transient electrical characteristics attached during at least the initial computation or iteration in the second stage transient electrical analyses, In some other embodiments, the first stage transient electrical characteristics may be represented by one or more functions (e.g., a polynomial function obtained by curve fitting, etc.), and these first stage transient electrical characteristics may be attached to the parasitic injected representation (e.g., as initial values for the second stage transient electrical analyses) by computing the values of these characteristics at one or more specific time points (e.g., the end time points, the midpoint, etc. of a second time step) corresponding to a second time step.

The second stage transient electrical analyses may then be performed at 310D on the parasitic injected representation for the second time step with the effective resistance value for the power gate, which is now represented as a resistor having time-varying resistance values. These attached first stage transient electrical characteristics may then be used during the current second time step in the second stage transient electrical analyses and may be further revised by the second stage transient electrical analyses during subsequent second time steps until a stopping criterion for the second stage transient electrical analyses is met.

FIG. 3E illustrates another more detailed block diagram for a part of the block diagram for implementing an electronic design with time varying resistors in power gate analysis illustrated in FIGS. 3B-C in some embodiments. More specifically, FIG. 3E illustrates a more detailed block diagram for implementing an electronic design with time varying resistors in power gate analysis during a second stage transient electrical analyses where a transistor model is identified to represent a power gate. In these embodiments, power gates may be represented in the parasitic injected representation in the form of one or more non-linear or large-signal models that describe the operating area of the corresponding power gates. Some examples of such large-signal or non-linear transistor models include a physical transistor model, an empirical transistor model, a tabular transistor model, or any combinations thereof.

In these embodiments, a determination is made at 302E to decide whether a transistor model is selected to represent the power gate identified at 308B. If the determination result is negative, the process may proceed to 304E to continue the process with the appropriate transistor model for the power gate illustrated in, for example, FIG. 3D or FIG. 3F. If the determination result is affirmative at 302E, a solver module may be identified at 306E for the transistor model. For example, an iterative solver may be identified at 306E to handle the non-linearity of the transistor model; and a table look-up module may also be identified to handle a tabular transistor model.

The second stage transient electrical analyses may then be performed at 308E on the parasitic injected representation for the second time step with the transistor model for the power gate as well as the corresponding solver module. The attached first stage transient electrical characteristics may then be used in the second stage transient electrical analyses during the current second time step and may be further revised by the second stage transient electrical analyses during subsequent second time steps until a stopping criterion for the second stage transient electrical analyses is met.

FIG. 3F illustrates another more detailed block diagram for a part of the block diagram for implementing an electronic design with time varying resistors in power gate analysis illustrated in FIGS. 3B-C in some embodiments. More specifically, FIG. 3F illustrates a more detailed block diagram for implementing an electronic design with time varying resistors in power gate analysis during a second stage transient electrical analyses where a fixed resistance model is identified to represent a power gate. In these embodiments, power gates may be represented in the parasitic injected representation in the form of fixed resistors having their respective fixed resistance values.

In these embodiments, a determination is made at 302F to decide whether a fixed resistance model is selected to represent the power gate identified at 308B. If the determination result is negative, the process may proceed to 304F to continue the process with the appropriate transistor model for the power gate illustrated in, for example, FIG. 3D or FIG. 3E. If the determination result is affirmative at 302F, the fixed resistance value may be identified at 306F for the fixed resistor representing the power gate. A fixed resistance model requires no or very little computation and thus may be suited for purposes such as quick evaluations of device stability, gain, noise, bandwidth, design feasibility, etc.

As described above, the second stage transient electrical analyses may adaptively select different models to represent the same power gate based in part or in whole upon one or more criteria including a speed criterion, an accuracy criterion, a criterion about balanced speed and accuracy, the purpose of the electrical analyses (e.g., for quick evaluation, verification, signoff, etc.), the correctness, accuracy, or deviations thereof for the simulated electrical behavior of the underlying electronic design, or any combination thereof in some embodiments. Therefore, the second stage transient electrical analysis may select the appropriate model to represent one or more power gates depending on the circumstances to achieve a balance between accuracy and performance (e.g., speed) in these embodiments.

The second stage transient electrical analyses may then be performed at 308F on the parasitic injected representation for the second time step with the fixed resistance model for the power gate. The attached first stage transient electrical characteristics may then be used in the second stage transient electrical analyses during the current second time step and may be further revised by the second stage transient electrical analyses during subsequent second time steps until a stopping criterion for the second stage transient electrical analyses is met.

Figure 4:
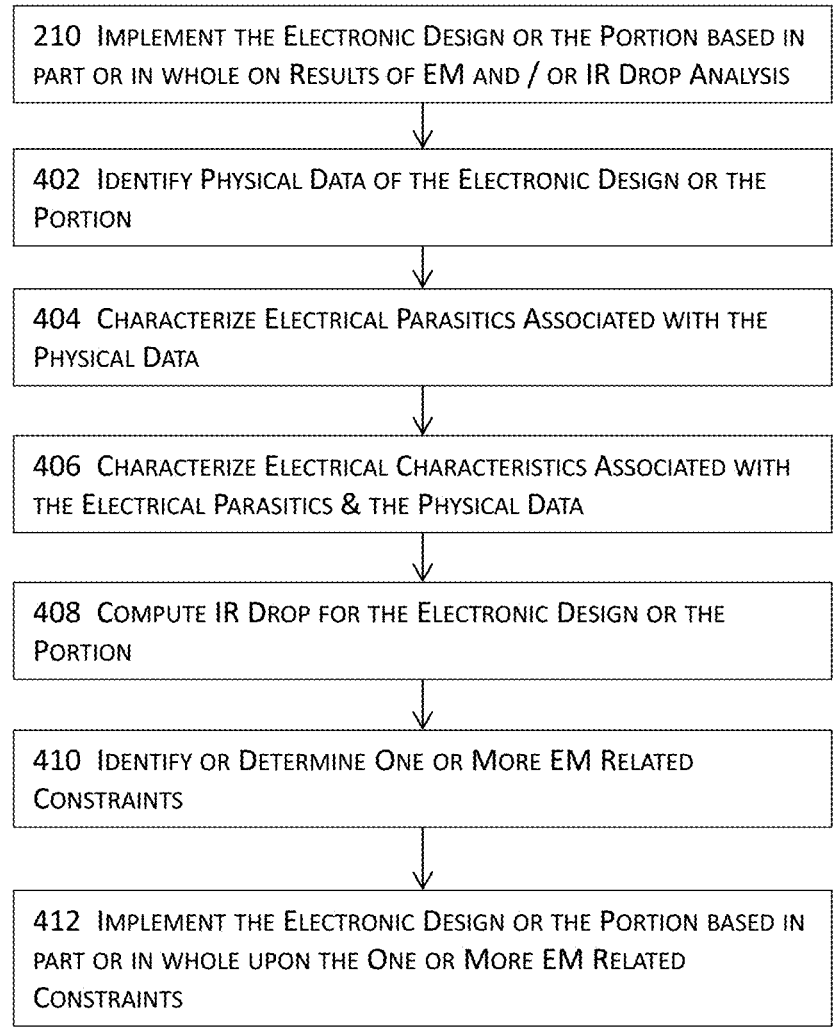
FIG. 4 illustrates a more detailed block diagram for a part of the block diagram for implementing an electronic design with time varying resistors in power gate analysis illustrated in FIG. 2 in some embodiments.

FIG. 4 illustrates a more detailed block diagram for a part of the block diagram for implementing an electronic design with time varying resistors in power gate analysis illustrated in FIG. 2 in some embodiments. More specifically, FIG. 4 illustrates a more detailed block diagram for the act 210 of implementing an electronic design or a portion thereof based in part or in whole upon results of EM and/or IR drop analysis. In these embodiments, physical data of the electronic design or a portion thereof may be identified at 402.

The physical data may be identified at 402 for circuit components including, for example, a net, a portion of a net, a device, a circuit component, a cell, a block, etc. The physical data may include, for example, width, length, cross-sectional area, descriptions of gate, source, and drain regions, materials, electrical properties (e.g., bulk resistivity), thermal properties, etc. in some embodiments.

Electrical parasitics associated with the physical data may be characterized at 404. For example, resistance values, self-inductance and/or coupled-inductance values, gate to contact capacitance, gate related fringe capacitance values, cross-coupling capacitance values, any other parasitic values or effects, or any combinations thereof may be characterized at 404 by using at least the physical data identified at 402 in some embodiments.

Electrical characteristics associated with the electrical parasitics and the physical data may be characterized at 406. For example, average, root-mean squared (RMS), or peak electric currents, voltages, current densities may be characterized at 406 from the first stage and/or the second stage analysis or simulation results. With the electrical parasitics characterized at 404 and the electrical characteristics characterized at 406, IR drop effects may be computed at 408 for the electronic design or the portion thereof. For example, voltages at various nodes in the electronic design or the portion thereof may be determined by determining the voltage drops of various current flows through various resistive components in the electronic design or the portion thereof and examining whether the nodal voltages may cause any undesired effects.

In addition or in the alternative, one or more electromigration related constraints may be identified at 410. These one or more electro-migration related constraints may include, for example, one or more limits on current densities for one or more nets, devices, or circuit components, one or more functions of the physical data, the electrical parasitics, or any combinations thereof (e.g., a constraint expressed as a function of the geometric dimensions), Black's equation for electro-migration reliability of a wire, or any other suitable constraints concerning diffusions (e.g., boundary diffusion, bulk diffusion, surface diffusion, etc.), thermal effects, lattice structures, etc. that may affect the electromigration effects.

Electro-migration analysis may then be performed with the electrical characteristics, the electrical parasitics, and the physical data to determine whether the electronic design or the portion thereof identified at 402 may exhibit some weak areas as far as electro-migration reliability is concerned. The electronic design or the portion thereof may then be implemented at 412 based in part or in whole upon the results of the IR drop analysis and/or the electro-migration analysis. For example, the electronic design may be modified locally to address any IR drop or EM concerns or violations to ensure the correctness of the physical data and/or other data while observing the requirements of the IR drop and/or electro-migration analysis results.

Figure 5A:
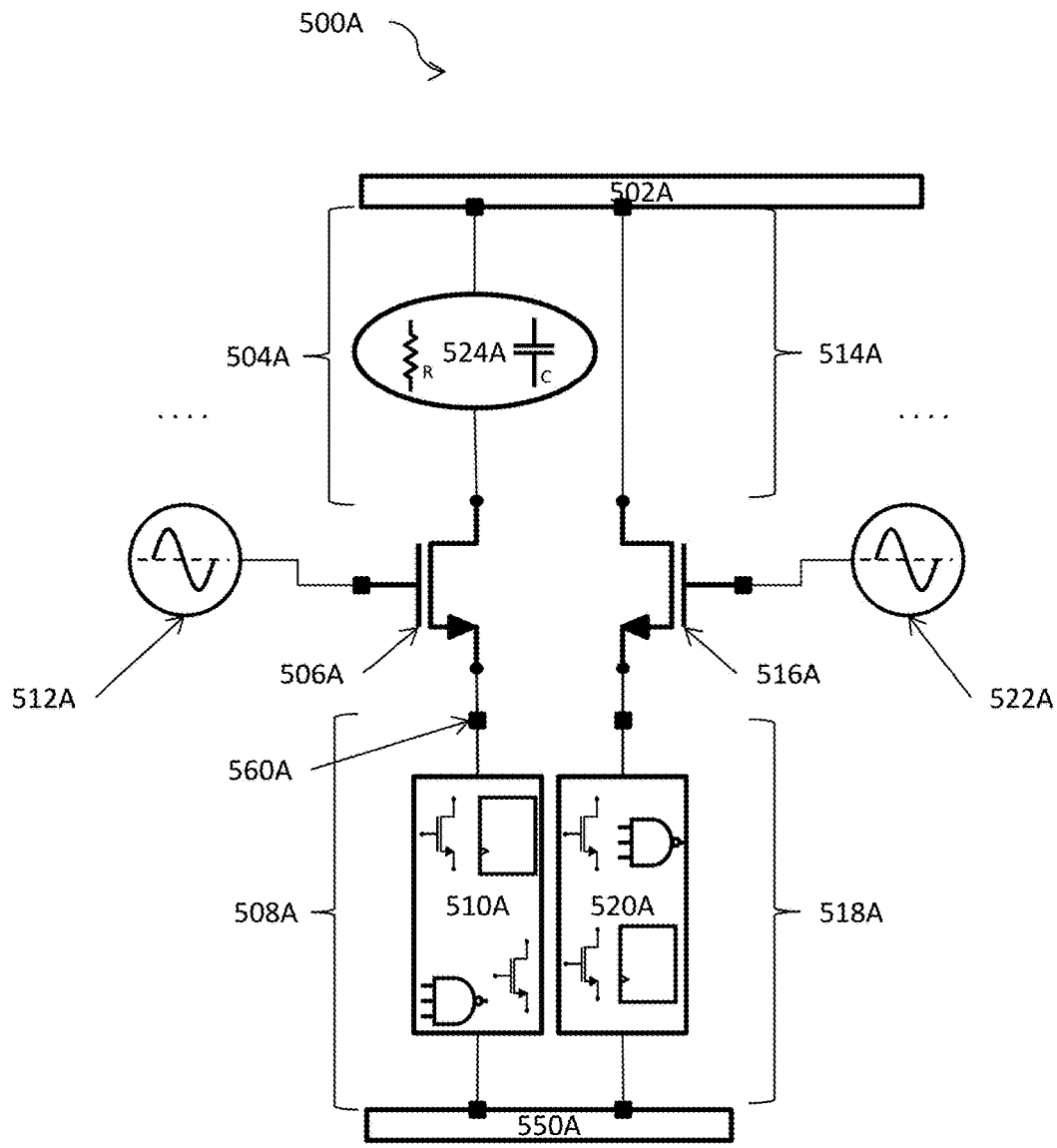
FIG. 5A illustrates an example of a portion of an electronic design on to which techniques for implementing an electronic design with time varying resistors in power gate analysis may be applied in some embodiments.

FIG. 5A illustrates an example of a portion of an electronic design on to which techniques for implementing an electronic design with time varying resistors in power gate analysis may be applied in some embodiments. In this example, the portion of the electronic design includes a power rail or a power stripe 502A supplying power (e.g., $V_{DD}$) to a first power net 504A, which further includes a first RLC network 524A, and a second power net 514A. The first power net 504A is connected to a first power gate 506A that receives its control signal 512A to control the first virtual power net 508A that further includes a first set of actual power consumers 510A that is connected to the ground 550A (e.g., $V_{SS}$).

Unlike the first RLC network 524A in the first power net, the second power net 514A connects a second power gate 516A directly to the power rail or power stripe 502A. The second power gate 516A receives its respective control signal from 522A and controls the power supplied to a second virtual power net 518A that further includes a second set of actual power consumers 520A that is also connected to the ground 550A. Various techniques described herein apply with full and equal effects to both the first and second power nets, regardless of whether a power gate is connected directly without any intervening circuit components or indirectly with one or more circuit components.

Figure 5B:
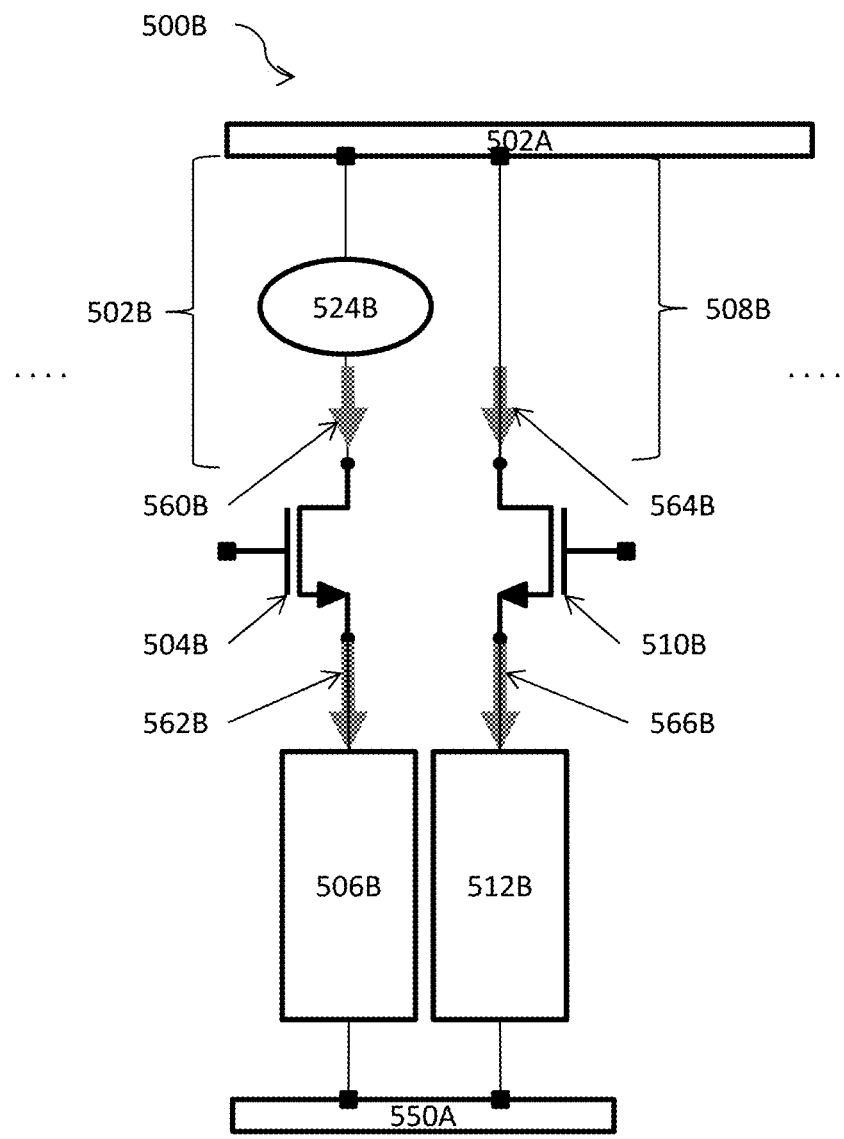
FIG. 5B illustrates an example of a representation of the portion of the electronic design illustrated in FIG. 5A to which techniques for implementing an electronic design with time varying resistors in power gate analysis may be performed in some embodiments.

FIG. 5B illustrates an example of a representation of the portion of the electronic design illustrated in FIG. 5A to which techniques for implementing an electronic design with time varying resistors in power gate analysis may be performed in some embodiments. More specifically, FIG. 5B illustrates an example of a representation of the portion of the electronic design illustrated in FIG. 5A where power gates are represented as transistor models during the second stage transient electrical analyses in these embodiments.

In this example, the first power net 502B including the first RLC network 524B is represented as a reduced representation that includes no or only a smaller portion of parasitic information in the first power net for the first stage transient electrical analyses described above with reference to FIGS. 2A-B and 3A-F. The first power net 502B including the first RLC network 524B is nevertheless represented as a more complete representation (e.g., a parasitic injected representation) that includes some or all of the parasitic information or effects in the first power net 504A.

Similarly, the second power net 508B directly connecting the second power gate 510B to the power rail or power stripe 502A is also represented as a reduced representation that includes no or only a smaller portion of parasitic information in the second power net 514A for the first stage transient electrical analyses described above with reference to FIGS. 2A-B and 3A-F. The second power net 508B is nevertheless represented as a more complete representation (e.g., a parasitic injected representation) that includes some or all of the parasitic information or effects in the second power net 514A.

During the first stage transient electrical analyses, the first power gate 504B may be represented as a transistor model (e.g., a non-linear transistor model) having its own device characteristics and parameters. Similarly, the second power gate 510B may also be represented as a transistor model having its own device characteristics and parameters. During the second stage transient electrical analyses, a power gate (e.g., the first power gate 504B and/or the second power gate 510B) may be represented as a non-linear or large-signal transistor model.

In addition, the first virtual power net 506B may be represented as a reduced representation that includes no or only a smaller portion of parasitic information in the first virtual power net for the first stage transient electrical analyses described above with reference to FIGS. 2A-B and 3A-F. The first virtual power net 506B may nevertheless be represented as a more complete representation (e.g., a parasitic injected representation) that includes some or all of the parasitic information or effects in the first virtual power net 510A.

Similarly, the second virtual power net 512B may also be represented as a reduced representation that includes no or only a smaller portion of parasitic information in the second virtual power net 520A during the first stage transient electrical analyses described above with reference to FIGS. 2A-B and 3A-F. The second virtual power net 512B may nevertheless be represented as a more complete representation (e.g., a parasitic injected representation) that includes some or all of the parasitic information or effects in the second virtual power net 520A.

In some embodiments where the first stage and/or the second stage transient analysis includes a voltage-based, rather than current-based, characterization of the electrical behavior of an electronic design. In these embodiments, the transient electrical analysis solves for the voltages at various nodes in the electronic design, rather than for probed electric currents through these various nodes, to avoid time consuming iterations (e.g., iterative process to solve the conductance matrix problem including the probed electric currents with a linear solver). With these voltage values (e.g., voltage waveforms) produced by these voltage-based approaches, electric currents (e.g., 560B, 562B, 564B, and 566B) may be concurrently computed by utilizing the corresponding voltage-current relations and/or the device characteristics or parameters (e.g., the transistor parameters or characteristics of the power gates 504B and 510B) without iteratively solving for these probed electric currents with time-consuming, computation-intensive processes.

Figure 5C:
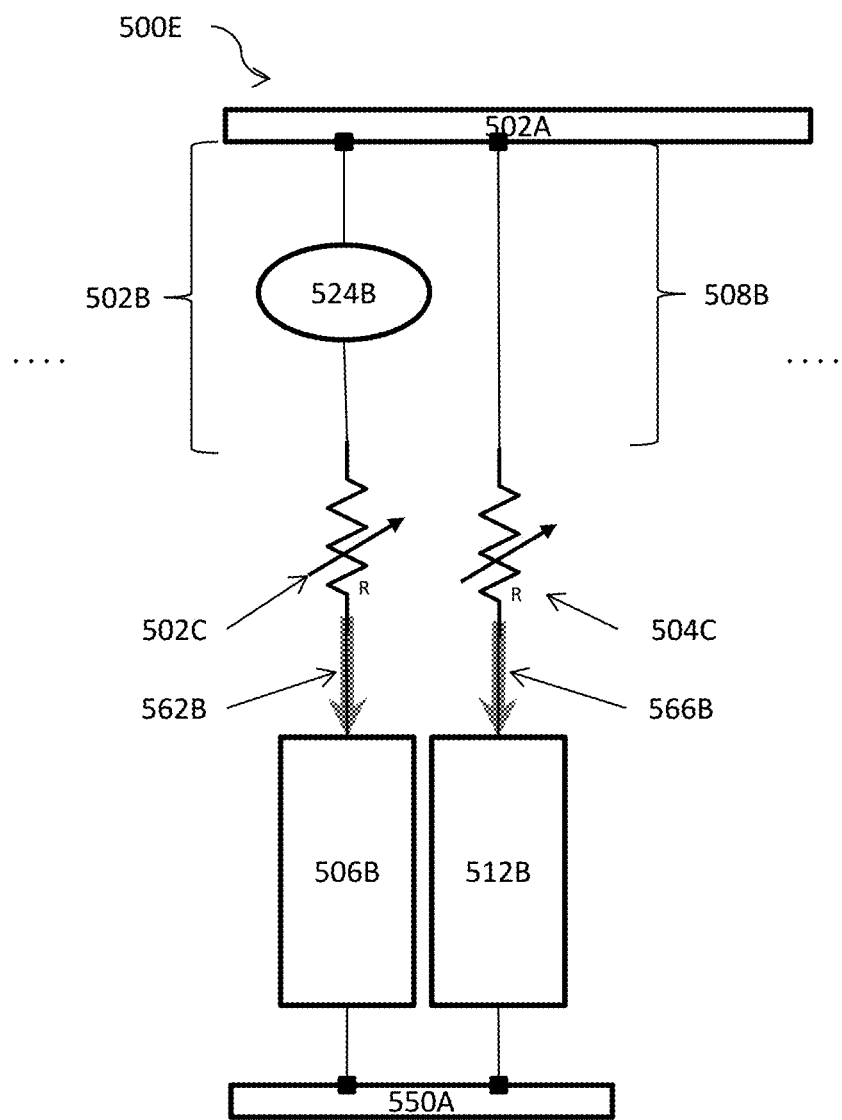
FIG. 5C illustrates another example of a representation of the portion of the electronic design illustrated in FIG. 5A to which techniques for implementing an electronic design with time varying resistors in power gate analysis may be performed in some embodiments.

FIG. 5C illustrates another example of a representation of the portion of the electronic design illustrated in FIG. 5A to which techniques for implementing an electronic design with time varying resistors in power gate analysis may be performed in some embodiments. More specifically, FIG. 5C illustrates an example of a representation of the portion of the electronic design illustrated in FIG. 5A where power gates are represented as time-varying resistance models during the second stage transient electrical analyses in these embodiments.

In this example, the first power net 502B including the first RLC network 524B may be represented as a reduced representation that includes no or only a smaller portion of parasitic information in the first power net for the first stage transient electrical analyses described above with reference to FIGS. 2A-B and 3A-F. The first power net 502B including the first RLC network 524B may nevertheless be represented as a more complete representation (e.g., a parasitic injected representation) that includes some or all of the parasitic information or effects in the first power net 504A.

Similarly, the second power net 508B directly connecting the second power gate 504C to the power rail or power stripe 502A may also be represented as a reduced representation that includes no or only a smaller portion of parasitic information in the second power net 514A for the first stage transient electrical analyses described above with reference to FIGS. 2A-B and 3A-F. The second power net 508B may nevertheless be represented as a more complete representation (e.g., a parasitic injected representation) that includes some or all of the parasitic information or effects in the second power net 514A.

During the first stage transient electrical analyses, the first power gate 502C may be represented as a transistor model (e.g., a non-linear transistor model) having its own device characteristics and parameters. Similarly, the second power gate 504C may also be represented as a transistor model having its own device characteristics and parameters. During the second stage transient electrical analyses, a power gate (e.g., the first power gate 502C and/or the second power gate 504C) may be represented as a non-linear or large-signal transistor model.

In addition, the first virtual power net 506B may be represented as a reduced representation that includes no or only a smaller portion of parasitic information in the first virtual power net for the first stage transient electrical analyses described above with reference to FIGS. 2A-B and 3A-F. The first virtual power net 506B may nevertheless be represented as a more complete representation (e.g., a parasitic injected representation) that includes some or all of the parasitic information or effects in the first virtual power net 510A.

Similarly, the second virtual power net 512B may also be represented as a reduced representation that includes no or only a smaller portion of parasitic information in the second virtual power net 520A during the first stage transient electrical analyses described above with reference to FIGS. 2A-B and 3A-F. The second virtual power net 512B may nevertheless be represented as a more complete representation (e.g., a parasitic injected representation) that includes some or all of the parasitic information or effects in the second virtual power net 520A.

In some embodiments where the first stage and/or the second stage transient analysis includes a voltage-based, rather than current-based, characterization of the electrical behavior of an electronic design. In these embodiments, the transient electrical analysis solves for the voltages at various nodes in the electronic design, rather than for probed electric currents through these various nodes, to avoid time consuming iterations (e.g., iterative process to solve the conductance matrix problem including the probed electric currents with a linear solver). With these voltage values (e.g., voltage waveforms) produced by these voltage-based approaches, electric currents (e.g., 562B and 566B) may be concurrently computed by utilizing the corresponding voltage-current relations (e.g., the time-varying resistance values from the time-varying resistance model 502C and 504C) without iteratively solving for these probed electric currents with time-consuming, computation-intensive processes.

Figure 5D:
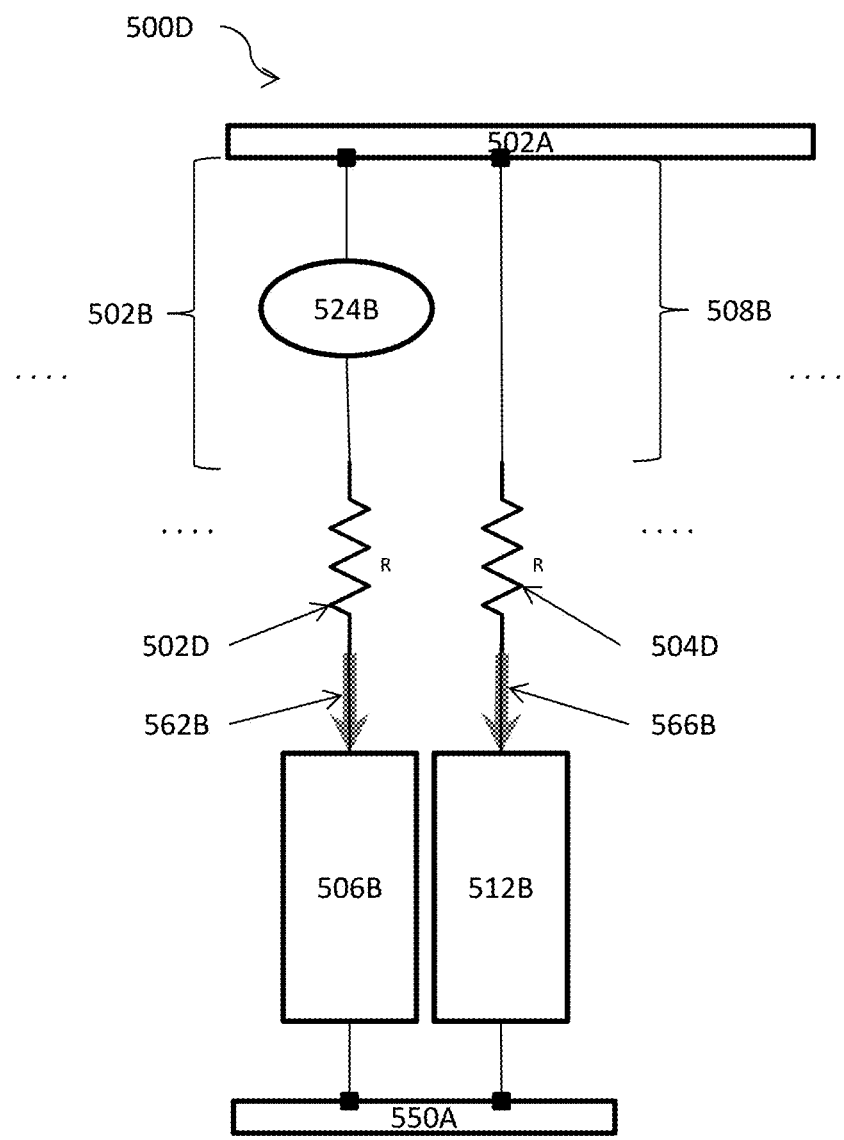
FIG. 5D illustrates another example of a representation of the portion of the electronic design illustrated in FIG. 5A to which techniques for implementing an electronic design with time varying resistors in power gate analysis may be performed in some embodiments.

FIG. 5D illustrates another example of a representation of the portion of the electronic design illustrated in FIG. 5A to which techniques for implementing an electronic design with time varying resistors in power gate analysis may be performed in some embodiments. More specifically, FIG. 5D illustrates an example of a representation of the portion of the electronic design illustrated in FIG. 5A where power gates are represented as fixed resistance models during the second stage transient electrical analyses in these embodiments.

In this example, the first power net 502B including the first RLC network 524B may be represented as a reduced representation that includes no or only a smaller portion of parasitic information in the first power net for the first stage transient electrical analyses described above with reference to FIGS. 2A-B and 3A-F. The first power net 502B including the first RLC network 524B may nevertheless be represented as a more complete representation (e.g., a parasitic injected representation) that includes some or all of the parasitic information or effects in the first power net 504A.

Similarly, the second power net 508B directly connecting the second power gate 504D to the power rail or power stripe 502A may also be represented as a reduced representation that includes no or only a smaller portion of parasitic information in the second power net 514A for the first stage transient electrical analyses described above with reference to FIGS. 2A-B and 3A-F. The second power net 508B may nevertheless be represented as a more complete representation (e.g., a parasitic injected representation) that includes some or all of the parasitic information or effects in the second power net 514A.

During the first stage transient electrical analyses, the first power gate 502D may be represented as a transistor model (e.g., a non-linear transistor model) having its own device characteristics and parameters. Similarly, the second power gate 504D may also be represented as a transistor model having its own device characteristics and parameters. During the second stage transient electrical analyses, a power gate (e.g., the first power gate 502D and/or the second power gate 504D) may be represented as the same fixed resistance model or as two different fixed resistance models.

In addition, the first virtual power net 506B may be represented as a reduced representation that includes no or only a smaller portion of parasitic information in the first virtual power net for the first stage transient electrical analyses described above with reference to FIGS. 2A-B and 3A-F. The first virtual power net 506B may nevertheless be represented as a more complete representation (e.g., a parasitic injected representation) that includes some or all of the parasitic information or effects in the first virtual power net 510A.

Similarly, the second virtual power net 512B may also be represented as a reduced representation that includes no or only a smaller portion of parasitic information in the second virtual power net 520A during the first stage transient electrical analyses described above with reference to FIGS. 2A-B and 3A-F. The second virtual power net 512B may nevertheless be represented as a more complete representation (e.g., a parasitic injected representation) that includes some or all of the parasitic information or effects in the second virtual power net 520A.

In some embodiments where the first stage and/or the second stage transient analysis includes a voltage-based, rather than current-based, characterization of the electrical behavior of an electronic design. In these embodiments, the transient electrical analysis solves for the voltages at various nodes in the electronic design, rather than for probed electric currents through these various nodes, to avoid time consuming iterations (e.g., iterative process to solve the conductance matrix problem including the probed electric currents with a linear solver). With these voltage values (e.g., voltage waveforms) produced by these voltage-based approaches, electric currents (e.g., 562B and 566B) may be concurrently computed by utilizing the corresponding voltage-current relations and/or the device characteristics or parameters (e.g., the fixed resistance values of the fixed resistance model 502D and 504D) without iteratively solving for these probed electric currents with time-consuming, computation-intensive processes.

SYSTEM ARCHITECTURE OVERVIEW

Figure 6:
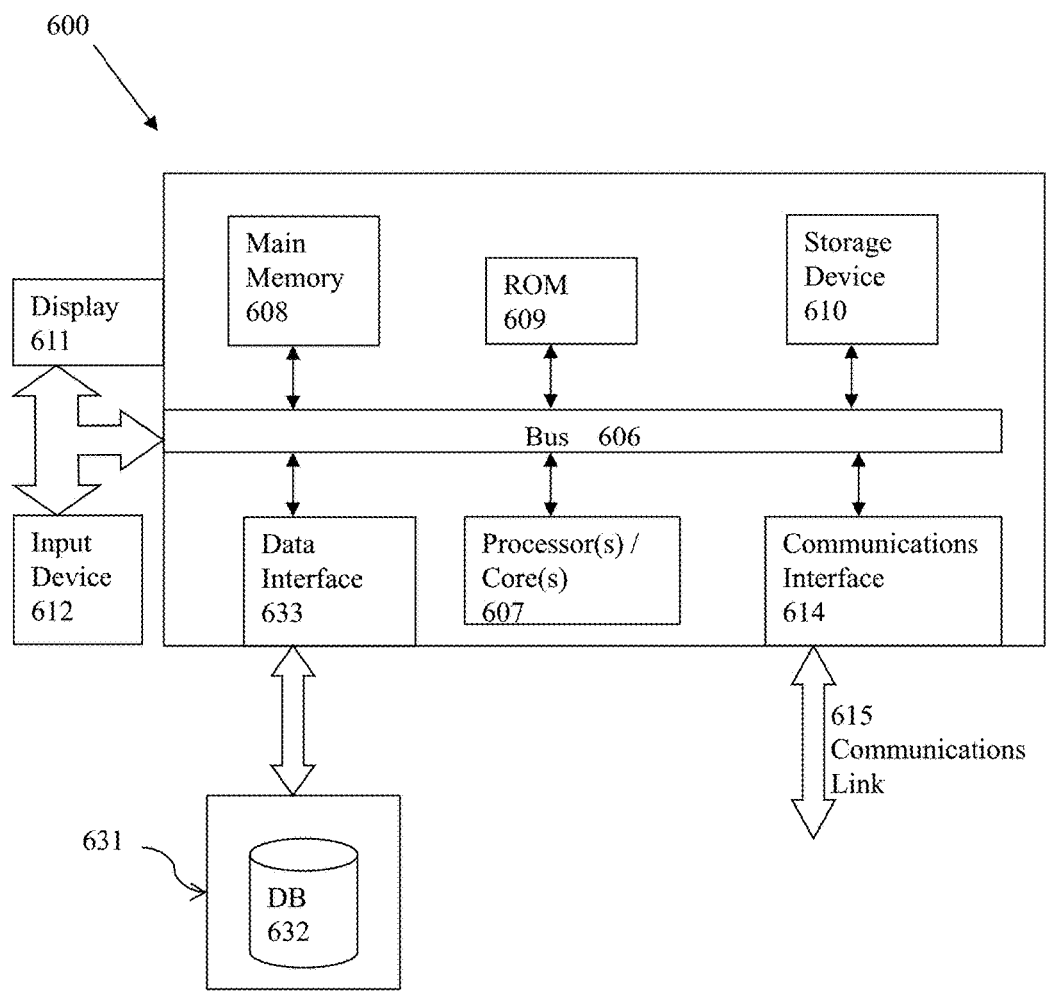
FIG. 6 illustrates a computerized system on which a process for implementing an electronic design with time varying resistors in power gate analysis may be implemented.

FIG. 6 illustrates a block diagram of a simplified illustration of a computing system 600 suitable for FIG. 6 illustrates a computerized system on which a method for implementing an electronic design with time varying resistors in power gate analysis as described in the preceding paragraphs with reference to various figures. Computer system 600 includes a bus 606 or other communication module for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown).

According to one embodiment, computer system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads. For example, the act of extracting, the act of determining, the act of representing, the act of generating, the act of performing one or more analyses, etc. may be performed by one or more processors, one or more processor cores, or combination thereof.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, i.e., application code, through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that includes a database 632 that is readily accessible by the computer system 600. The computer system 600 communicates with the data storage system 631 through a data interface 633.

A data interface 633, which is coupled to the bus 606 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing an electronic design with power gate analyses using one or more time-varying circuit component models, comprising:

implementing, at an electronic design implementation module including or functioning in conjunction with the at least one processor of and stored at least partially stored in a non-transitory computer readable storage medium, an electronic design or a portion thereof at least by including a power gate in the electronic design or the portion;

generating first stage electrical characteristic values representing a set of electrical characteristics of the electronic design or the portion thereof at least by performing a first stage electrical analysis on a reduced representation of the electronic design or the portion thereof;

identifying a time-varying model that represents at least one circuit component for the power gate in the electronic design, wherein an electrical characteristic represented in the time-varying model comprises an electrical resistance and corresponds to one or more constant values in a first plurality of time periods and varies with time in a second plurality of time periods;

generating second stage electrical characteristic values representing the set of electrical characteristics of the electronic design or the portion thereof at least by performing a second stage electrical analysis on a parasitic injected representation of the electronic design or the portion thereof with the time-varying model for the power gate, wherein the first stage electrical analysis or the second stage electrical analysis is performed on the electronic design or the portion thereof, without requiring one or more iterative processes involving a conductance data structure that represents the electronic design; and implementing the electronic design or the portion thereof based in part or in whole upon the first stage electrical characteristic values and the second stage electrical characteristic values of the set of characteristics.

2. The computer implemented method of claim 1, further comprising:

selecting the time-varying model from a plurality of models for the power gate based in part or in whole upon one or more criteria.

3. The computer implemented method of claim 1, further comprising:

identifying a power net connecting the power gate to a power rail or a power stripe; and determining a reduced power net representation for the power net.

4. The computer implemented method of claim 3, further comprising:

identifying a virtual power net connected to the power gate and receiving power from the power rail or the power stripe via the power gate; and determining a reduced virtual power net representation for the virtual power net.

5. The computer implemented method of claim 4, further comprising:

identifying a non-linear transistor model for the power gate; and determining the reduced representation for the first stage electrical analysis at least by identifying the non-linear transistor model for the power gate, the reduced power net representation, and the reduced virtual power net representation into the reduced representation.

6. The computer implemented method of claim 1, further comprising:

determining a set of first-stage time steps for the first stage electrical analysis; and generating the first stage electrical characteristic values at least by performing the first stage electrical analysis on the reduced representation of the electronic design or the portion thereof with the set of first-stage time steps.

7. The computer implemented method of claim 1, further comprising:

identifying a first set of circuit components in the power net and a second set of circuit components in the virtual power net;

determining a first representation for the first set of circuit components and a second representation for the second set of circuit components;

identifying at least some parasitic information associated with the power net and/or the virtual power net; and identifying the time-varying resistance model from a plurality of models for the power gate for the second stage electrical analysis based in part or in whole upon one or more criteria.

8. The computer implemented method of claim 7, further comprising:

generating the parasitic injected representation at least by identifying the first representation, the second representation, and the time-varying resistance model for the power gate into the parasitic injected representation and further by attaching or stitching the at least some parasitic information to parasitic injected representation.

9. The computer implemented method of claim 1, further comprising:

initiating the second stage electrical analysis on the parasitic injected representation of the electronic design or the portion thereof; and combining or associating the first stage electrical characteristic values from the first stage electrical analysis with the parasitic injected representation.

10. The computer implemented method of claim 1, further comprising:

identifying the first stage electrical characteristic values generated from the first stage electrical analysis;

determining a second-stage time step of a set of second-stage time steps for the second stage electrical analysis based in part or in whole upon at least some of the first stage electrical characteristic values; and determining the second stage electrical characteristic values during the second-stage time step at least by performing the second stage electrical analysis on the parasitic injected representation with the time-varying model.

11. The computer implemented method of claim 10, further comprising:

determining whether a different model is to be selected for the power gate;

selecting the different model for the power gate when it is determined that the different model is to be selected for the power gate; and updating the reduced representation with at least the different model.

12. The computer implemented method of claim 10, further comprising:

identifying the at least some of the first stage electrical characteristic values determined by the first stage electrical analysis; and determining an effective resistance value for the time-varying resistance model of the power gate during the second-stage time step based in part or in whole upon the at least some of the first stage electrical characteristic values.

13. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing an electronic design with power gate analyses using one or more time-varying circuit component models, the set of acts comprising:

implementing, at a physical electronic design implementation module including or functioning in conjunction with the at least one processor of and stored at least partially stored in a non-transitory computer readable storage medium, an electronic design or a portion thereof at least by including at least a power gate in the electronic design or the portion;

generating first stage electrical characteristic values representing a set of electrical characteristics of the electronic design or the portion thereof at least by performing a first stage electrical analysis on a reduced representation of the electronic design or the portion thereof;

identifying a time-varying model that represents at least one circuit component for the power gate in the electronic design, wherein an electrical characteristic represented in the time-varying model comprises an electrical resistance and corresponds to one or more constant values in a first plurality of time periods and varies with time in a second plurality of time periods;

generating second stage electrical characteristic values representing the set of electrical characteristics of the electronic design or the portion thereof at least by performing a second stage electrical analysis on a parasitic injected representation of the electronic design or the portion thereof with the time-varying model for the power gate, wherein the first stage electrical analysis or the second stage electrical analysis is performed on the electronic design or the portion thereof, without requiring one or more iterative processes involving a conductance data structure that represents the electronic design; and implementing the electronic design or the portion thereof based in part or in whole upon the first stage electrical characteristic values and the second stage electrical characteristic values of the set of characteristics.

14. The article of manufacture of claim 13, the set of acts further comprising:
identifying the first stage electrical characteristic values generated from the first stage electrical analysis; and
determining a second-stage time step of a set of second-stage time steps for the second stage electrical analysis based in part or in whole upon at least some of the first stage electrical characteristic values; and
determining the second stage electrical characteristic values during the second-stage time step at least by performing the second stage electrical analysis on the parasitic injected representation with the time-varying model.

15. The article of manufacture of claim 14, the set of acts further comprising:
determining whether a different model is to be selected for the power gate;
selecting the different model for the power gate when it is determined that the different model is to be selected for the power gate; and
updating the reduced representation with at least the different model.

16. The article of manufacture of claim 15, the set of acts further comprising:
identifying the at least some of the first stage electrical characteristic values determined by the first stage electrical analysis; and
determining an effective resistance value for the time-varying resistance model of the power gate during the second-stage time step based in part or in whole upon the at least some of the first stage electrical characteristic values.

17. The article of manufacture of claim 13, the set of acts further comprising:
identifying a first set of circuit components in the power net and a second set of circuit components in the virtual power net;
determining a first representation for the first set of circuit components and a second representation for the second set of circuit components;
identifying at least some parasitic information associated with the power net and/or the virtual power net;
identifying the time-varying resistance model from a plurality of models for the power gate for the second stage electrical analysis based in part or in whole upon one or more criteria; and
generating the parasitic injected representation at least by identifying the first representation, the second representation, and the time-varying resistance model for the power gate into the parasitic injected representation and further by attaching or stitching the at least some parasitic information to parasitic injected representation.

18. A computer implemented method for implementing an electronic design with power gate analyses using time varying resistors, comprising:
implementing, at an electronic design implementation module including or functioning in conjunction with at least one processor of and stored at least partially stored in a non-transitory computer readable storage medium, an electronic design or a portion thereof at least by including a power net, a virtual power net, and a power gate interconnecting the power net and the virtual power net;
selecting a model from a plurality of models comprising at least one time-varying model that represents an electrical resistance as one or more constant values in a first plurality of time periods and time-varying values in a second plurality of time periods, each representing the power gate, based in part or in whole upon one or more criteria for analyzing the electronic design or the portion thereof;
generating electrical behavior of the electronic design or the portion thereof at least by performing one or more transient electrical analyses in a plurality of stages on one or more representations of the power net, the virtual power net, and the model for the power gate, wherein the one or more transient electrical analyses are performed on the electronic design or the portion thereof in the plurality of stages to determine the electrical behavior in the plurality of stages, without requiring one or more iterative processes involving a conductance data structure that represents the electronic design; and
implementing the electronic design or the portion thereof based in part or in whole upon the one or more electrical analyses or simulations.

19. The method of claim 18, wherein the one or more criteria for analyzing the electronic design or the portion thereof comprise a criterion for balancing accuracy and performance in the one or more transient electrical analyses and a criterion for characterizing ramp-up and/or ramp-down of the power gate.

20. The method of claim 18, performing the one or more transient electrical analyses on the one or more representations comprising:
identifying a transistor model for the power gate for a first stage transient electrical analysis;
performing the first stage transient electrical analysis on the transistor model of the power gate and a reduced representation of the power net and/or the virtual power net;
identifying a time-varying model for the power gate for a second stage transient electrical analysis; and
performing the second stage transient electrical analysis on the time-varying model of the power gate and a parasitic injected representation of the power net and/or the virtual power net.

* * * * *